(12) United States Patent
Young et al.

(10) Patent No.: US 9,754,405 B1
(45) Date of Patent: Sep. 5, 2017

(54) SYSTEM, METHOD AND COMPUTER-READABLE MEDIUM FOR ORGANIZING AND RENDERING 3D VOXEL MODELS IN A TREE STRUCTURE

(71) Applicant: NGRAIN (Canada) Corporation, Vancouver (CA)

(72) Inventors: Jonathan Young, Vancouver (CA); Craig Furness, Vancouver (CA); Meru Brunn, Vancouver (CA)

(73) Assignee: NGRAIN (CANADA) CORPORATION, Vancouver, BC (CA)

( * ) Notice: Subject to any disclaimer, the term of this patent is extended or adjusted under 35 U.S.C. 154(b) by 107 days.

(21) Appl. No.: 14/822,560

(22) Filed: Aug. 10, 2015

(51) Int. Cl.
G06T 15/08 (2011.01)
G06T 17/00 (2006.01)

(52) U.S. Cl.
CPC ............ G06T 15/08 (2013.01); G06T 17/005 (2013.01)

(58) Field of Classification Search
None
See application file for complete search history.

(56) References Cited

U.S. PATENT DOCUMENTS

| | | | |
|---|---|---|---|
| 5,781,194 A | 7/1998 | Ponomarev et al. | |
| 6,532,017 B1 | 3/2003 | Peet et al. | |
| 6,867,774 B1 | 3/2005 | Halmshaw et al. | |
| 7,050,054 B2 | 5/2006 | Halmshaw | |
| 7,218,323 B1 | 5/2007 | Halmshaw et al. | |
| 7,317,456 B1 | 1/2008 | Lee | |
| 7,420,555 B1 | 9/2008 | Lee | |
| 7,881,878 B2 * | 2/2011 | Burrus | G01R 33/56341 600/410 |
| 7,965,290 B1 | 6/2011 | Kouznetsov et al. | |

(Continued)

FOREIGN PATENT DOCUMENTS

| | | |
|---|---|---|
| WO | 00/33257 A1 | 6/2000 |
| WO | 02/07088 A2 | 1/2002 |
| WO | 02/07089 A2 | 1/2002 |

OTHER PUBLICATIONS

Cyril Crassin, "GigaVoxels: A Voxel-Based Rendering Pipeline for Eddicient Exploration of Large and Detailed Scenes," Universite de Grenoble, Jul. 2011, 207 pages.

*Primary Examiner* — Said Broome
(74) *Attorney, Agent, or Firm* — Seed Intellectual Property Law Group LLP

(57) ABSTRACT

System, computer-readable medium and method are provided for organizing and rendering 3D voxel models in a tree data structure. The system includes a display, a memory loaded with 3D voxel data arranged in a $N^3$-tree data structure, and a processor that renders the 3D voxel data on the display. The $N^3$-tree data structure includes a top node, one or more levels of middle nodes, and leaf nodes. Each of the top node and middle nodes includes 64 occupancy bits and 32 index bits. The 64 occupancy bits indicate an occupied ("1") or empty ("0") state of each of 64 subunits (subcubes or voxels) included in the node. The 32 index bits represent a pointer to a memory location where its occupied subunits are stored. Each of the leaf nodes represents an occupied voxel, and includes an index number that can be used to point to a memory location of at least one type of attribute value (color, normal, intensity, etc.) of the occupied voxel.

26 Claims, 17 Drawing Sheets

(56) References Cited

U.S. PATENT DOCUMENTS

| | | | |
|---|---|---|---|
| 8,217,939 B1 | 7/2012 | Bonciu et al. | |
| 2007/0262988 A1* | 11/2007 | Christensen | G06T 15/08 345/424 |
| 2014/0210821 A1* | 7/2014 | Kapoor | G06T 15/08 345/424 |

* cited by examiner

P_Current (Voxel Coordinates) X, Y, Z:

| | | | | |
|---|---|---|---|---|
| X: | 33 | 22 | 11 | 00 |
| Y: | 33 | 22 | 11 | 00 |
| Z: | 33 | 22 | 11 | 00 |
| For Levels | 3 | 2 | 1 | 0 |

Coordinates: [00] [01] [10] or [11]

— 3

To extract level 3 coordinates, for each of X, Y and Z, apply the following mask

| | | | | | |
|---|---|---|---|---|---|
| 2-Bit Mask | 11 | 00 | 00 | 00 | |
| X, Y or Z Coordinate | 33 | 22 | 11 | 00 | (Logical And) |
| | 33 | 00 | 00 | 00 | |

Then shift right by 3x2=6

00 00 00 33     X, Y or Z Coordinate of Level 3 Extracted

FIG. 2

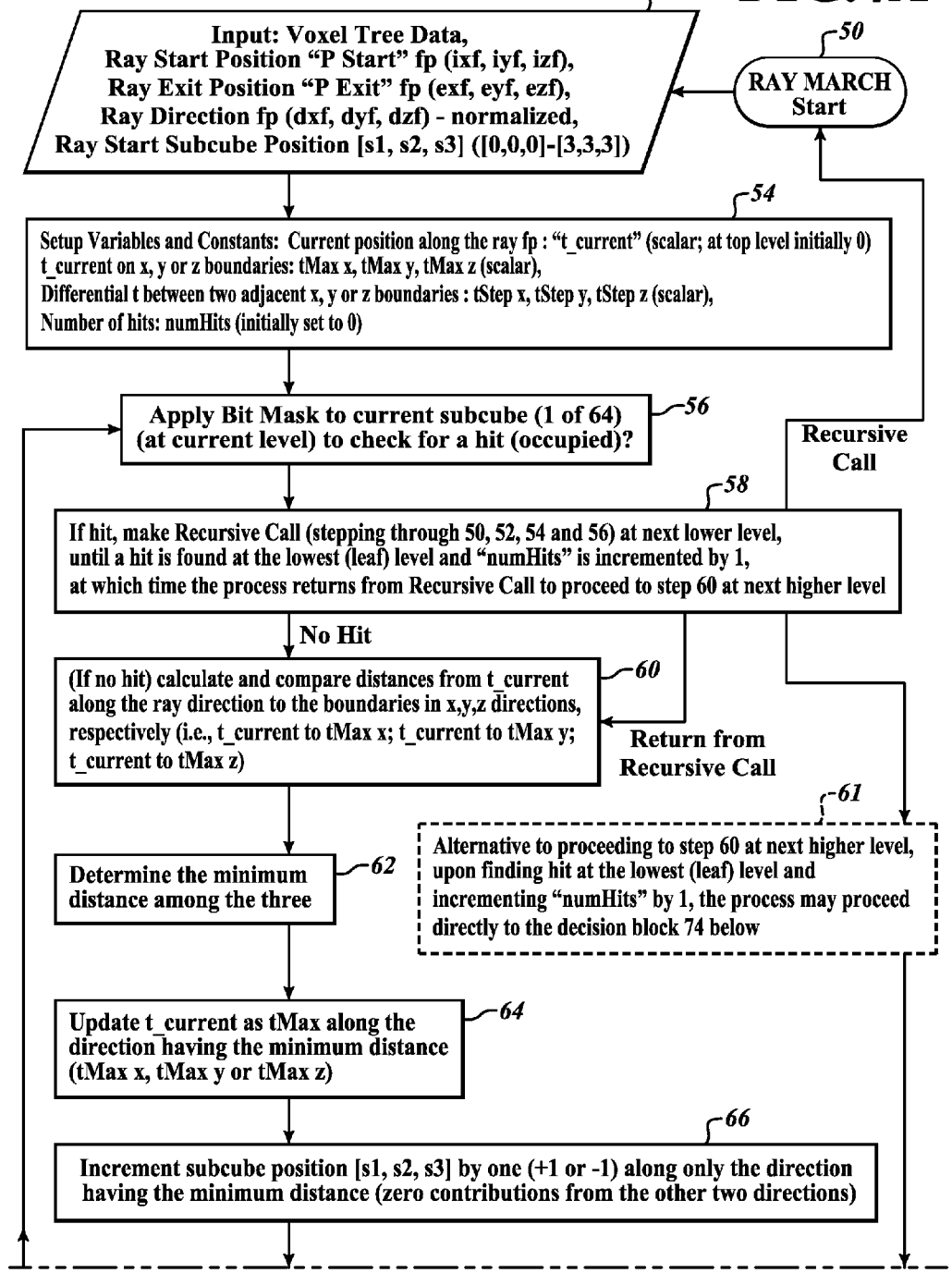

Apply alignment (i.e., boundary correction) by adding "Result After Correction" to Current Voxel Coordinate in case of Option 1. Option 2 will have "Result After Correction" subtracted from Current Subcube Coordinate.

Table 1.

| SubCube Coord | Voxel Coord | Diff | Correction Needed | Result After Correction |
|---|---|---|---|---|
| 3 | 2 | 1 | 0 | 1 |
| 3 | 0 | 3 | -4 | -1 |
| 2 | 1 | 1 | 0 | 1 |
| 2 | 3 | -1 | 0 | -1 |
| 1 | 0 | 1 | 0 | 1 |
| 1 | 2 | -1 | 0 | -1 |
| 0 | 3 | -3 | 4 | 1 |
| 0 | 1 | -1 | 0 | -1 |

Diff amount of 0 not shown, since no change. Diff amount > 1 not shown since Jump > 1 is not possible while performing the Bresenham walk.

Another way of stating the alignment is
for x is DiffX = (Current Subcube Coord) − (Calculated Subcube Coord) + ((DiffX < -1) << 2) − (DiffX > 1) << 2)).
The same principle applies for DiffY, DiffZ.

Option 1: Add "Result After correction" to Current Voxel Coordinate
Option 2: Subtract "Result After Correction" from Current Subcube Coordinate

Output: Adjusted Current Voxel (or Subcube) Coordinate

*FIG. 6B*

SYSTEM, METHOD AND COMPUTER-READABLE MEDIUM FOR ORGANIZING AND RENDERING 3D VOXEL MODELS IN A TREE STRUCTURE

BACKGROUND

Technical Field

The present invention relates generally to generating and processing a 3D graphics dataset, and more specifically to organizing and rendering 3D voxel models in a tree data structure.

Description of the Related Art

Three-dimensional ("3D") digital data may be produced by a variety of devices that involve three-dimensional scanning, sampling and/or numerical modeling. For example, laser scanners generate 3D digital data. A long range laser scanner is fixed in one location and rotated to scan objects around it. Alternatively, a short range laser scanner is mounted on a device that moves around an object to be scanned. In either case, the location of each point scanned is represented as a polar coordinate since the angle between the scanner and the object and distance from the scanner to the object are known. Typically the polar coordinates are then converted to 3D Cartesian coordinates and stored along with a corresponding intensity or color value for the data point collected by the scanner.

As described above, a 3D scanning/sampling/modeling device may generate 3D digital data by collecting a complete set of (x, y, z) locations that represent the shape of an object. The term "point cloud" is used to describe such point sets including a large number of points. The data points in point cloud data are unorganized and spaced irregularly within the cloud. While in some applications point cloud data can directly be used to generate 3D images, in other applications point cloud data can be transformed to volume graphics or 3D voxel data, which can then be used to generate 3D images. Some exemplary systems and methods for transforming point cloud data to volume graphics data are disclosed in commonly owned U.S. Pat. Nos. 7,317,456 B1 and 7,420,555 B1 both entitled "METHOD AND APPARATUS FOR TRANSFORMING POINT CLOUD DATA TO VOLUMETRIC DATA," which are incorporated herein by reference. In volume graphics, volume elements (i.e., "voxels") are the base data used to represent 3D objects. Typically, voxels are simply pixels that have a third coordinate z in addition to x and y coordinates in a Cartesian coordinate system (though voxels may take various other forms, also). In other words, voxels are equally sized cubes that form a discretely defined 3D space.

Volume graphics represent a promising way to achieve the degree of realism required for high quality 3D simulations and visualization applications because volume models can contain all the surface and internal characteristics of a real object. This is in contrast to, for example, polygon-based graphics, in which a mesh of polygons is used to represent only the surfaces of a 3D object.

3D voxel data are rendered to produce a 2D image on a suitable output device, such as a display or a printer. As used herein, the term "render" means to produce a 2D graphics image on an output device (e.g., a display screen) from a 3D graphics data model, and typically involves creating an image using various "attributes" such as color, normal (which indicates a direction of illumination to define shine), intensity (brightness/darkness), texture, etc., to give the image a realistic look.

Software available from NGRAIN (Canada) Corp. of Vancouver B.C., Canada, is suited for generating voxel data which can be rapidly rendered and also readily manipulated in real time. Briefly, NGRAIN® technology permits 3D modeling of an object, wherein each of multiple parts or layers forming the object is represented as a voxel set each consisting of one or more voxels. According to NGRAIN® technology, it is possible to render a large number of voxel sets representing multiple parts or layers together, while allowing a user to manipulate each part or layer separately in 3D space. For example, the user may break up the parts or layers to display an exploded view of an object, or may peel off an outer layer of the object to reveal its inner layer. Various details of NGRAIN® technology are described in commonly owned Patent Cooperation Treaty Publication No. WO 02/07088 A2 entitled "LIGHTING ADJUSTMENT METHODS AND APPARATUS FOR VOXEL DATA," commonly owned Patent Cooperation Treaty Publication No. WO 02/07089 A2 entitled "APPARATUS AND METHOD FOR ASSOCIATING VOXEL INFORMATION WITH DISPLAY POSITIONS," commonly owned U.S. Pat. No. 6,867,774 B1 entitled "METHOD AND APPARATUS FOR TRANSFORMING POLYGON DATA TO VOXEL DATA FOR GENERAL PURPOSE APPLICATIONS," commonly owned U.S. Pat. No. 7,050,054 B2 entitled "METHOD, APPARATUS, SIGNALS AND CODES FOR ESTABLISHING AND USING A DATA STRUCTURE FOR STORING VOXEL INFORMATION," commonly owned U.S. Pat. No. 7,218,323 B1 entitled "METHOD AND SYSTEM FOR RENDERING VOXEL DATA WHILE ADDRESSING MULTIPLE VOXEL SET INTERPENETRATION," commonly owned U.S. Pat. No. 7,965,290 B1 entitled "METHOD, SYSTEM, AND DATA STRUCTURE FOR PROGRESSIVE LOADING AND PROCESSING OF A 3D DATASET," and commonly owned U.S. Pat. No. 8,217,939 B1 entitled "METHOD AND SYSTEM FOR CALCULATING VISUALLY IMPROVED EDGE VOXEL NORMALS WHEN CONVERTING POLYGON DATA TO VOXEL DATA," which are all incorporated herein by reference. Additional details of NGRAIN® technology can also be found in an article entitled "Myths and Truths of Interactive Volume Graphics" published in I/ITSEC 2004 Conference, and in an article entitled "Applying Volume Graphics in a Maintenance Training Environment" published in I/ITSEC 2005 conference.

BRIEF SUMMARY

There is a continuing need to increase the speed of rendering solid objects modeled in 3D voxel data sets in high image quality. In part to address the need, various embodiments of the present invention are directed to organizing 3D voxel data in a tree data structure in which a top node and middle nodes in multiple levels, respectively, each consists of 64 occupancy bits and 32 index bits. The 64 occupancy bits of each node indicate the occupied or empty state of each of 64 subunits (subcubes or voxels) that are included in the node, with 1 indicating occupied and 0 indicating empty for example. The 32 index bits represent a pointer to a memory location where data about only the occupied subunits (subcubes or voxels) in the node (out of the total 64 subunits in the node including both occupied and empty subunits) are stored.

Various technical solutions are provided to increase the rendering speed of the 3D voxel data organized in such tree data structure in high image quality.

BRIEF DESCRIPTION OF THE SEVERAL VIEWS OF THE DRAWINGS

FIG. 2 illustrates an exemplary way of expressing voxel coordinates, wherein the x-, y- and z-coordinates of each voxel are expressed as a combination of x, y- and z-coordinates of 4×4×4 subunits ([0,0,0] through [3,3,3]) at respective levels, from the second from the top level to the lowest (voxel) level.

DETAILED DESCRIPTION

Figure 1:
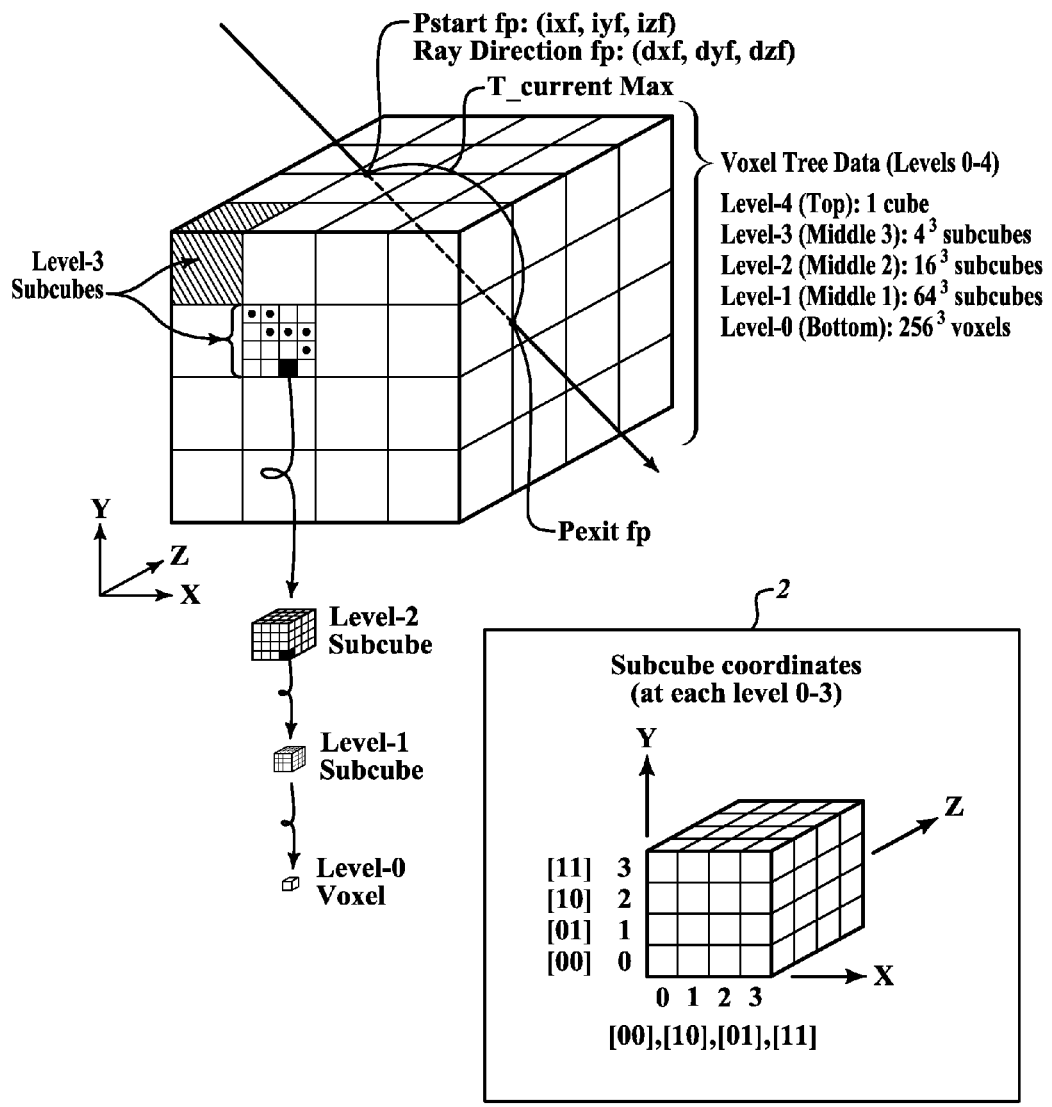
FIG. 1 illustrates a 5-level tree structure of voxel data, wherein each unit at a level contains 4×4×4 (64) subunits at a level immediately below, and the lowest-level unit is a voxel that cannot be further divided.

FIG. 1 illustrates a sample 3D voxel data consisting of a cube at the top level (Level 4 in the illustrated example), which includes 64 subcubes at level 3 ("level-3 subcubes"). The cube includes four level-3 subcubes along X-, Y- and Z-directions, respectively, and thus includes 64 level-3 subcubes in total. Each of the 64 level-3 subcubes in turn includes 64 subcubes at level 2 ("level-2 subcubes"), each of the 64 level-2 subcubes in turn includes 64 subcubes at level 1 ("level-1 subcubes"), and each of the 64 level-1 subcubes, which are the subcubes at the lowest level, includes 64 voxels. Thus, FIG. 1 illustrates a 5-level tree structure including 1 cube, $4^3$ level-3 subcubes, $16^3$ level-2 subcubes, $64^3$ level-1 subcubes, and $256^3$ voxels. The 5-level tree structure is exemplary only, and a typical 3D voxel data tree structure may include less or more than 5 levels.

Other subcube sizes are also possible and within the scope of the present disclosure. Any power of 3 can be used as a subcube size, such as $4^3=64$, $5^3=125$, $6^3=216$, etc. In various exemplary embodiments, $4^3=64$ may be advantageously used because it fits the standard memory unit access size of 64-bit architecture computers. Thus, while the following describes a 64-tree data structure as an exemplary embodiment, the present invention can be implemented with $N^3$-tree data structure where N is a positive integer.

The 3D voxel data structure according to exemplary embodiments may be considered as being arranged in two (overlapping) coordinate systems: a set of discrete subcube (subunit) coordinate systems at levels 0-3, respectively, herein termed a "subcube coordinate" system, and a combination of all subcube (subunit) coordinate systems at levels 0-3, which is expressed as floating point values, herein termed a "voxel coordinate" system. For example, as shown in box 2 in FIG. 1, a subcube coordinate system at level 3 indicates the position of each level-3 subcube as its X-, Y- and Z-coordinates, which may take one of four values, 0, 1, 2 and 3 because the level-4 cube is divided into 4×4×4 level-3 subcubes in the illustrated embodiment. Any of 64 level-3 subcube positions can be expressed as (x, y, z)=[0, 0, 0], [0, 0, 1], [0, 1, 0] . . . [3, 3, 2] and [3, 3, 3].

Similarly, a subcube coordinate system at level 2 indicates positions of 64 level-2 subcubes included in a level-3 subcube as (x, y, z)=[0, 0, 0] to [3, 3, 3], and a subcube coordinate system at level 1 indicates positions of 64 level-1 subcubes included in a level-2 subcube as (x, y, z)=[0, 0, 0] to [3, 3, 3]. Further similarly, a subcube coordinate system at level 0 indicates positions of 64 level-0 voxels included in a level-1 subcube as (x, y, z)=[0, 0, 0] to [3, 3, 3].

A sample "voxel coordinate" system is illustrated in box 3 in FIG. 2, in which a position of a level-0 voxel is defined as a combination of all subcube coordinates at levels 0-3 along X-, Y- and Z-directions, respectively, expressed as three floating point values. In box 3, "33" represents a value selected from 0, 1, 2 and 3 (i.e., [0,0], [0,1], [1,0] and [1,1] in binary), to indicate a level-3 subcube position along X-, Y- and Z-directions, respectively. Similarly, "22" represents a value selected from 0, 1, 2 and 3, to indicate a level-2 subcube position along X-, Y- and Z-directions, respectively, within the level-3 subcube whose position was specified by values "33," and "11" represents a value selected from 0, 1, 2 and 3, to indicate a level-1 subcube position along X-, Y- and Z-directions, respectively, within the level-2 subcube whose position was specified by values "22." Finally, "00" represents a value selected from 0, 1, 2 and 3, to indicate a level-0 voxel position along X-, Y- and Z-directions, respectively, within the level 1 subcube whose position was specified by values "11."

Referring back to FIG. 1, the voxel coordinate of each voxel (out of total $256^3$ voxels in the illustrated example) is expressed as a combination of three floating point values along X-, Y- and Z directions. For example, P start position at which an incident ray intersects (enters) the voxel cube, to be described below, is expressed as (ixf, iyf, izf), where ixf, iyf and izf are floating point values.

Use and alignment of the two types of coordinate systems—the subcube coordinate system and the voxel coordinate system—will be described more fully below in connection with a system and method for rendering the 3D voxel data on a 2D display (see FIG. 4).

Figure 3:
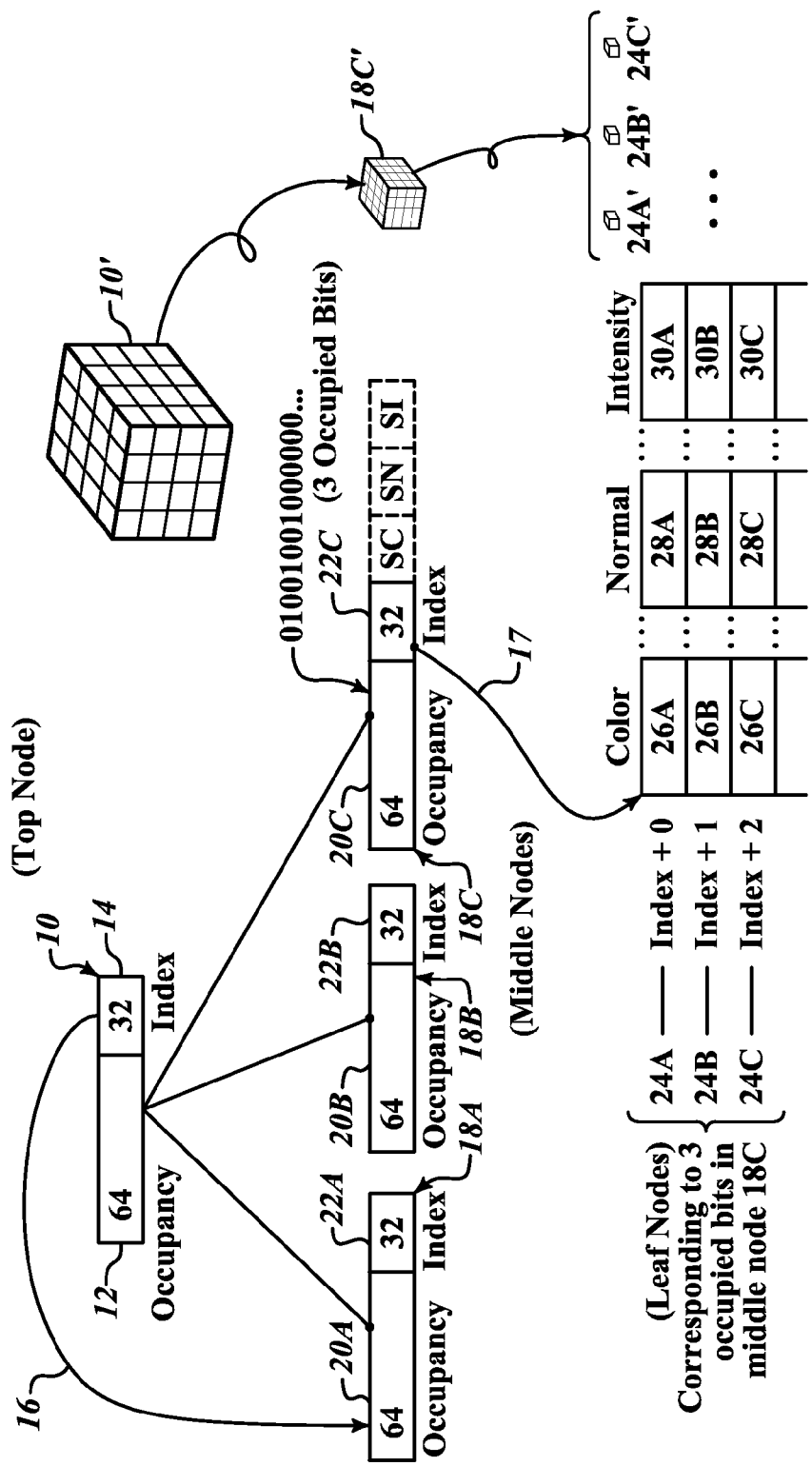
FIG. 3 illustrates that, in a tree data structure according to embodiments of the present invention, each node consists of 64 occupancy bits that indicate the occupied or empty state of each of 64 subunits included in the node, and 32 index bits that point to a memory location where data about only the occupied subunits (subcubes or voxels) in the node (out of the total 64 subunits in the node including both occupied and empty voxels) are stored. When the subunits are the lowest nodes, i.e., voxels, the 32 index bits point to a memory location where the attribute values (e.g., color, normal, intensity) of occupied voxels are stored.

In addition to FIG. 1, FIG. 3 illustrates that the 3D voxel data may be arranged in a 64-tree data structure, including a top node 10 representing the level-4 cube 10'. The top node 10, which is representative of the level-4 cube 10', includes 64 occupancy bits (12) and 32 index bits (14), wherein an occupied or empty state of each of 64 level-3 subcubes (e.g., 18C' in FIG. 3) in the cube 10' is indicated by 1 bit, with 1 indicating an occupied state and 0 indicating an empty state, for example. (Alternatively, 0 may indicate an occupied state and 1 may indicate an empty state in some embodiments.) The 32 index bits represent a first pointer to a memory location of "occupied" middle nodes 18A, 18B and 18C, which are level-3 subcubes in the illustrated embodiment. The function of the first pointer pointing to the beginning of the middle nodes is illustrated by an arrow 16 in FIG. 3. Note that data about only the occupied middle nodes 18A, 18B and 18C, out of possibly up to 64 middle nodes at level 3, are stored in the memory location pointed to by the first pointer.

The middle nodes 18A, 18B and 18C represent M (three in the illustrated embodiment) number of "occupied" subcubes, respectively, each in turn including 64 occupancy bits (20A, 20B, 20C) and 32-bit index bits (22A, 22B, 22C). For ease of illustration, only one level of middle nodes (e.g., level-3 nodes) is included in FIG. 3, though there may be multiple (for example three middle levels—level-3, level-2, and level-1, as in FIG. 1) may be included between the top node representing the top cube 10' and the bottom (leaf) nodes representing voxels. Note that no middle nodes exist for empty (unoccupied) subcubes in the tree structure according to embodiments of the present invention. Only the middle nodes for "occupied" subcubes (i.e., subcubes that ultimately include occupied voxels) are generated and stored contiguously, to thereby minimize memory requirement and also to be accessible sequentially and rapidly according to exemplary embodiments of the present invention. Though the middle nodes 18A, 18B and 18C are illustrated in a spaced-apart manner in FIG. 3 for clarify of illustration, in memory the middle nodes are stored contiguously according to various embodiments of the present invention.

In each of the middle nodes 18A, 18B and 18C, an occupied or empty state of each of 64 subunits (i.e., subcubes or voxels) included in the middle node is indicated by the 64 occupancy bits 20A, 20B and 20C. In the illustrated example in which the middle nodes 18A, 18B and 18C may be considered as level-1 nodes immediately above the voxel node level, an occupied or empty state of each of 64 voxels included in the level-1 middle node is indicated by 1 bit of the 64 occupancy bits (20A, 20B, 20C), with 1 indicating an occupied voxel and 0 indicating an empty voxel, for example. For example, as illustrated in FIG. 3, the middle node 18C representing the third occupied level-1 subcube 18C' includes the 64 occupancy bits (20C) that are "01001001000000 . . . " including three "1"s at the $2^{nd}$, $5^{th}$, and $8^{th}$ positions, respectively. The three "1"s at the $2^{nd}$, $5^{th}$, and $8^{th}$ positions indicate three positions of the occupied voxels (e.g., [0, 0, 1], [0, 1, 0], and [0, 1, 3]), respectively, amongst the 64 possible positions [0,0,0]-[3,3,3] within the level-1 subcube 18C' represented by the middle node 18C.

The 32 index bits of the middle node 18C represent a second pointer to a memory location of the three occupied leaf (voxel) nodes included in the subcube 18C'. The function of the second pointer pointing to the beginning of the occupied leaf nodes (voxels) included in the subcube 18C' is illustrated by an arrow 17 in FIG. 3. No leaf nodes exist for empty (unoccupied) voxels. Only the leaf nodes for occupied voxels are generated and stored contiguously to minimize memory requirement and also to be accessible sequentially and rapidly. Thus, in the illustrated embodiment, only three leaf nodes 24A, 24B and 24C are stored, which respectively represent the three occupied voxels at the $2^{nd}$, $5^{th}$, and $8^{th}$ positions within the subcube 18C'.

Unlike the top node and the middle node, the leaf node does not include the 64 occupancy bits because there are no lower nodes than the leaf node, i.e., because the voxel is not further divided into 64 subunits whose occupancy statuses need to be tracked. Also unlike the top node and the middle node, the leaf node does not include the 32 index bits, but rather includes an index number (0, 1, 2 . . . ), which is to be added to the memory location indicated by the second pointer 17. That is, the second pointer points to the beginning of the leaf nodes (indicated as "INDEX" in FIG. 3), and the index number 0, 1, 2, . . . is to be added to the INDEX to point to a memory location of at least one attribute value (e.g., color, normal, intensity, etc.) of the corresponding occupied voxel. Attribute values characterize the appearance of each voxel when the 3D voxel data is rendered on a 2D display, and typically multiple attributes are used to confer a realistic look to the 3D voxel data when rendered. In the illustrated example, three attribute values are defined for each of the three occupied voxels of 24A, 24B, and 240. For the first occupied voxel at the leaf node 24A, color value 26A, normal value 28A, and intensity value 30A are defined. For the second occupied voxel at the leaf node 24B, color value 26B, normal value 28B, and intensity value 30B are defined. For the third occupied voxel at the leaf node 240, color value 260, normal value 280, and intensity value 300 are defined.

As illustrated in FIG. 3, the leaf nodes 24A, 24B, and 240 are respectively associated with index numbers 0, 1, and 2, respectively. By adding the index number to the "INDEX" indicated by the second pointer (arrow 17), which indicates the beginning of the leaf nodes, a memory location of the attribute value(s) of the corresponding voxel can be derived. For example, the color value 26A of the first leaf node 24A can be located by adding index number 0 to the "INDEX" pointed to by the second pointer. As illustrated, all attribute values (color, normal, intensity) for the first leaf node 24A may be aligned in memory. Thus, the derived memory location of the color value 26A can be additionally used to locate the normal (28A) and intensity (30A) values for the first leaf node 24A. That is, one index number (0 in this example) provides access to all types of attributes associated with one leaf node (one voxel). Similarly, the "INDEX" plus index number 1 points to a memory location of the attribute values (color, normal, intensity) of the second leaf node 24B, and the "INDEX" plus index number 2 points to a memory location of the attribute values (color, normal, intensity) of the third leaf node 24C.

In various embodiments, each value type is stored in a separate contiguous memory array. Such memory arrangement advantageously allows for many different embodiments of different attribute combinations as desired in a tree format. The memory arrangement also takes advantage of "cache line" optimizations in modern computer memory where each attribute can form its own "cache line" within the context of the index generating tree data structure as disclosed in the present application.

The 3D voxel data structured in the manner disclosed above is technically advantageous in minimizing overall memory space and also increasing access time to needed data (i.e., data regarding occupied subcubes and occupied voxels), to achieve rapid rendering of 3D voxel data.

In some embodiments, it is possible to additionally store a summary attribute value in association with each middle node representing a subcube. For example, a summary color value (SC), a summary normal value (SN), and a summary intensity value (SI) may be stored for the middle node 18C representing the subcube 18C' in FIG. 3. It should be noted that, in FIG. 3, summary attribute values SC, SN and SI are conceptually illustrated with the subcube 18C', but in various embodiments SC, SN and SI may be stored in separate arrays for flexibility when adding/removing attributes.

A summary attribute value may be a combination of attribute values of the voxels included in the subcube, for example, a combination of color values 26A, 26B, and 26C in the illustrated example of FIG. 3, or may be a value independently determined for the middle node 18C to provide realistic rendition of the 3D voxel data at a resolution corresponding to the level of the middle node 18C. For example, if a particular display is incapable of rendering the 3D voxel data in high resolution that can render each of the occupied voxels discernably, a rendering program may stop traversing the tree structure at the level of the middle node 18C and render the subcube 18C', represented by the middle node 18C, using the summary attribute values SC, SN, SI associated with the subcube 18C'

Figure 4B:
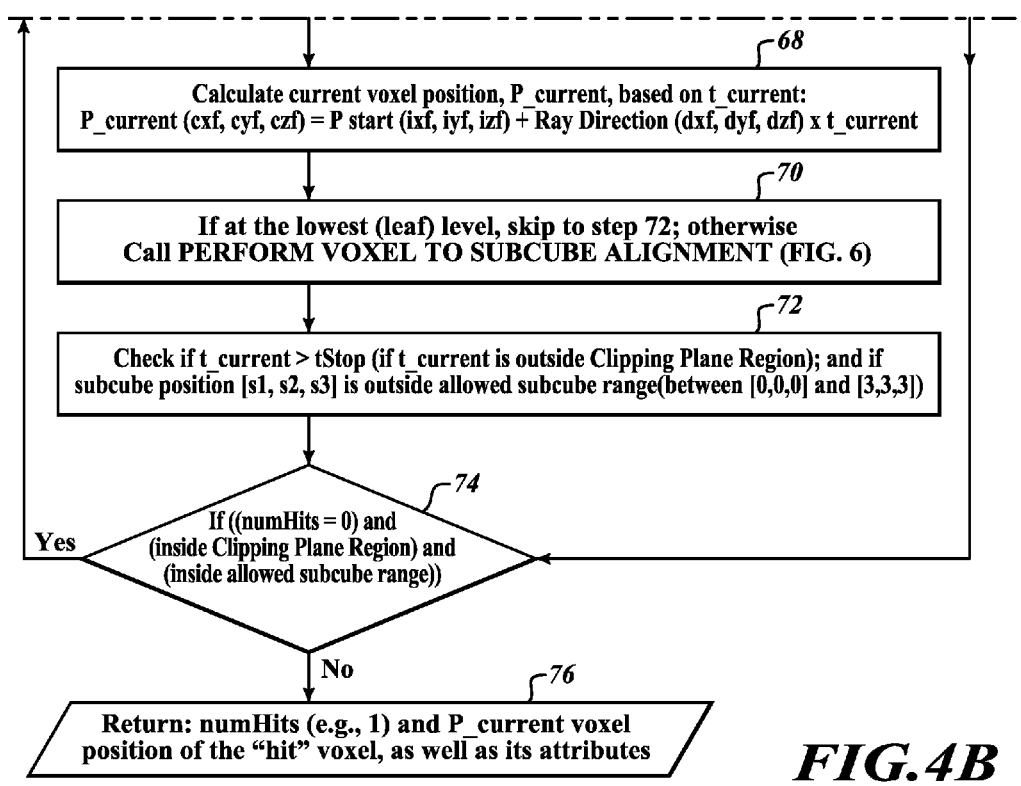
FIG. 4 is a flow chart illustrating a ray marching algorithm, which may be used to render 3D voxel data arranged in a tree structure according to embodiments of the present invention.

FIG. 4 is a flow chart illustrating a sample algorithm that may be used to render the 3D voxel data, which is structured in a manner disclosed above, on a 2D screen according to exemplary embodiments of the present invention. The rendering algorithm employs a Bresenham's ray march algorithm with additional technical solutions to achieve rapid and accurate rendering of 3D voxel data.

The "Ray March" rendering algorithm starts at block 50 of FIG. 4. Block 52 illustrates input values needed for the ray march, including the 3D voxel data structured in a manner disclosed above, to be rendered. To render the 3D voxel data, the algorithm calculates the path of a ray incident on the 3D voxel data, which represents a viewer's perspective, to locate the occupied subcubes at successively lower middle levels to ultimately locate the occupied voxel(s) at the lowest leaf level along the path that should be visible to the viewer. In some embodiments, only one occupied subcube at each middle level and only one occupied voxel at the lowest leaf level are located and used for rendering. In other embodiments, however, two or more occupied subcubes at each middle level or two or more occupied voxels at the lowest leaf level may be used for rendering, for example, to show shading depth of a 3D object represented by the 3D voxel data.

Referring additionally to FIG. 1, input values may include a ray start position, P start (ixf, iyf, izf) and a ray exit position, P exit (exf, eyf, ezf) where all ixf, iyf, izf, exf, eyf, and ezf values are floating point values in the voxel coordinate system, as described above in reference to FIG. 2. Based on P start and P exit, ray direction vector value, Ray Dir. (dxf, dyf, dzf) may also be derived, where dxf, dyf, dzf are also floating point values. Based on the ray start "voxel coordinate" position P start (ixf, iyf, izf), a ray start "subcube coordinate" position [s1, s2, s3] is defined for the corresponding subcube level being considered. In the illustrated example of FIG. 1, the ray start "subcube coordinate" position is initially at level 3, and [x, y, z]=[2, 4, 3].

The start subcube containing the ray start "subcube coordinate" may either correspond to the top node, or as an optimization if the ray start position P start (ixf, iyf, izf) is fitted in the distinct volume enclosed by a middle node, to the middle node.

At block 54, variables and constants are set up. A variable, "t_current" is set as a scalar value to represent a current position along the ray between P start and P exit. For example, t_current may be set as 0 at P start of the top level (level-4 cube in FIG. 1) and may be set to reach value "10.0" at P exit at the top level.

A voxel coordinate position along the ray, P_current (in floating point values), may be expressed as follows:

$$P\_current(cxf,cyf,czf)=P\ start(ixf,iyf,izf)+Ray\ Dir.(dxf,dyf,dzf) \times t\_current \quad (Eq.\ 1)$$

FIG. 2 illustrates a sample format of P_current (cxf, cyf, czf), which is a combination of three floating point values respectively representing the x-, y- and z-coordinate values of the voxel. In the illustrated example, the ray direction vector value, Ray Dir. (dxf, dyf, dzf), is normalized such that (Eq. 1) is satisfied for the known P exit, in other words, such that P exit=P start+normalized Ray Dir.×t_current at P exit.

In block 54, three variables, tMax x, tMax y, and tMax z are set, to respectively represent t_current (scalar) values that fall on X-, Y-, and X-boundaries (grids) in the Cartesian coordinate system. Further, three constants, tStep x, tStep y, and tStep z are set, to respectively represent t (scalar) values between two adjacent X-, Y-, and Z-boundaries in the Cartesian coordinate system. Details of tMax x, tMax y, tMax z, tStep x, tStep y, and tStep z will be more fully described below in reference to FIG. 5. Finally, a variable representing the number of occupied voxels that are found along the ray (i.e., the number of "hits" or "numHits") is set up. Initially numHits is set to 0.

At block 56, a bit mask is applied to the current subcube (e.g., 1 of 64 level-3 subcubes) at the current level (e.g., Level 3) to check for a hit, i.e., to check whether the subcube is occupied or empty. In the illustrated embodiment of FIG. 1, the current level-3 subcube is the starting level-3 subcube located at [x, y, z]=[2, 4, 3].

Figure 5:
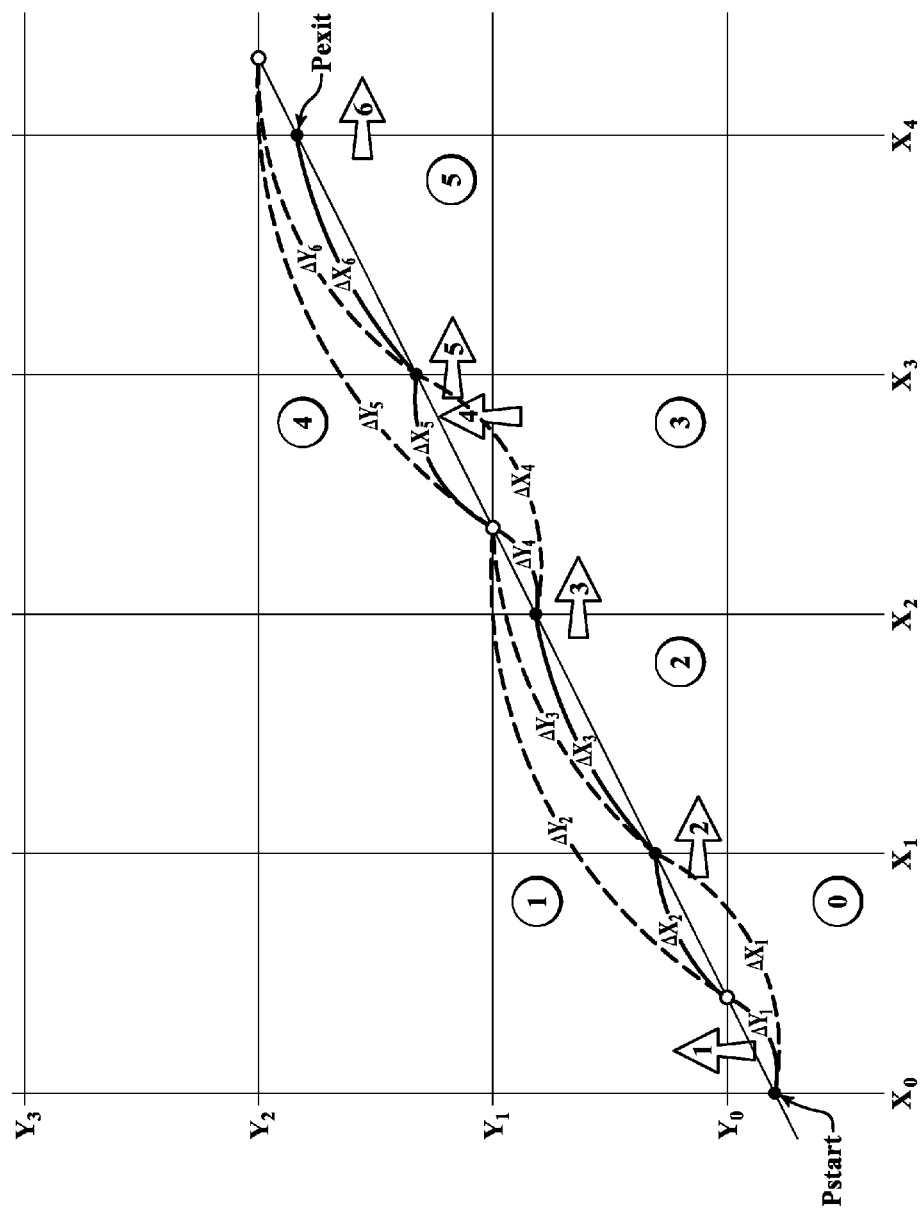
FIG. 5 is a diagram illustrating one example of ray marching based on the Bresenham's line algorithm, which may be used in the ray marching algorithm of FIG. 4.

If no hit is detected, i.e., if the current level-3 subcube is determined to be empty, then the ray marching algorithm needs to locate the next level-3 subcube to advance along the ray, which is adjacent to the current level-3 subcube along one of X-, Y-, and Z-directions. To that end, the algorithm skips block 58 and proceeds to block 60, where the algorithm calculates three distances respectively between t_current (which may be initially set as 0) and t position on the next X boundary, between t_current and t position on the next Y boundary, and between t_current and t position on the next Z boundary. FIG. 5 illustrates a 2D illustration of the distances calculated at block 60. For ease of illustration, FIG. 5 shows the ray marching process that occurs in X- and Y-directions only, though the same principles are applied to the ray marching additionally along Z-direction, as will be apparent to those skilled in the art. In FIG. 5, t_current is initially at P start, and the difference between t_current and tMax x (shown as a black circle), which is a t position along the ray on the next X boundary, is ΔX1. On the other hand, the difference between t_current and tMax y (shown as a white circle), which is a t position along the ray on the next Y boundary, is ΔY1.

At block 62, it is determined which of the three calculated differences is the smallest. In the 2D example of FIG. 5, the Y difference ΔY1 is smaller than the X difference ΔX1. Thus, at block 64, t_current (initially set to zero in the illustrate example) is updated to match tMax y along the direction (Y direction) having the minimum distance. That is, the marching direction is determined to be the Y direction, as indicated by a white arrow 1 in FIG. 5.

Accordingly, at block 66, the subcube position [s1, s2, s3] is incremented by one (+1 or −1) along only the direction having the minimum distance. In the illustrated example, the subcube position [s1, s2, s3] is incremented by +1 only along the Y direction, to become [s1, s2+1, s3].

At block 68, a current voxel coordinate position along the ray, P_current, is calculated based on the updated t_current value based on (Eq. 1) described above.

Thus, at this time, the current marching position is determined in two coordinate systems: the updated [s1, s2, s3] position in the level-3 subcube coordinate system, and updated P_current (cxf, cyf, czf) position in floating point values in the voxel coordinate system. It is discovered that a technical solution that continuously aligns the marching position between the two coordinate systems is advantageous in producing a high-quality rendering of the 3D voxel data with minimum artifacts. Thus, the algorithm includes such alignment process at block 70. If the current tree level is at the lowest leaf node level (level-0), the alignment process of block 70 is skipped and not performed because at the lowest level the two coordinate systems are presumably aligned.

Figure 6A:
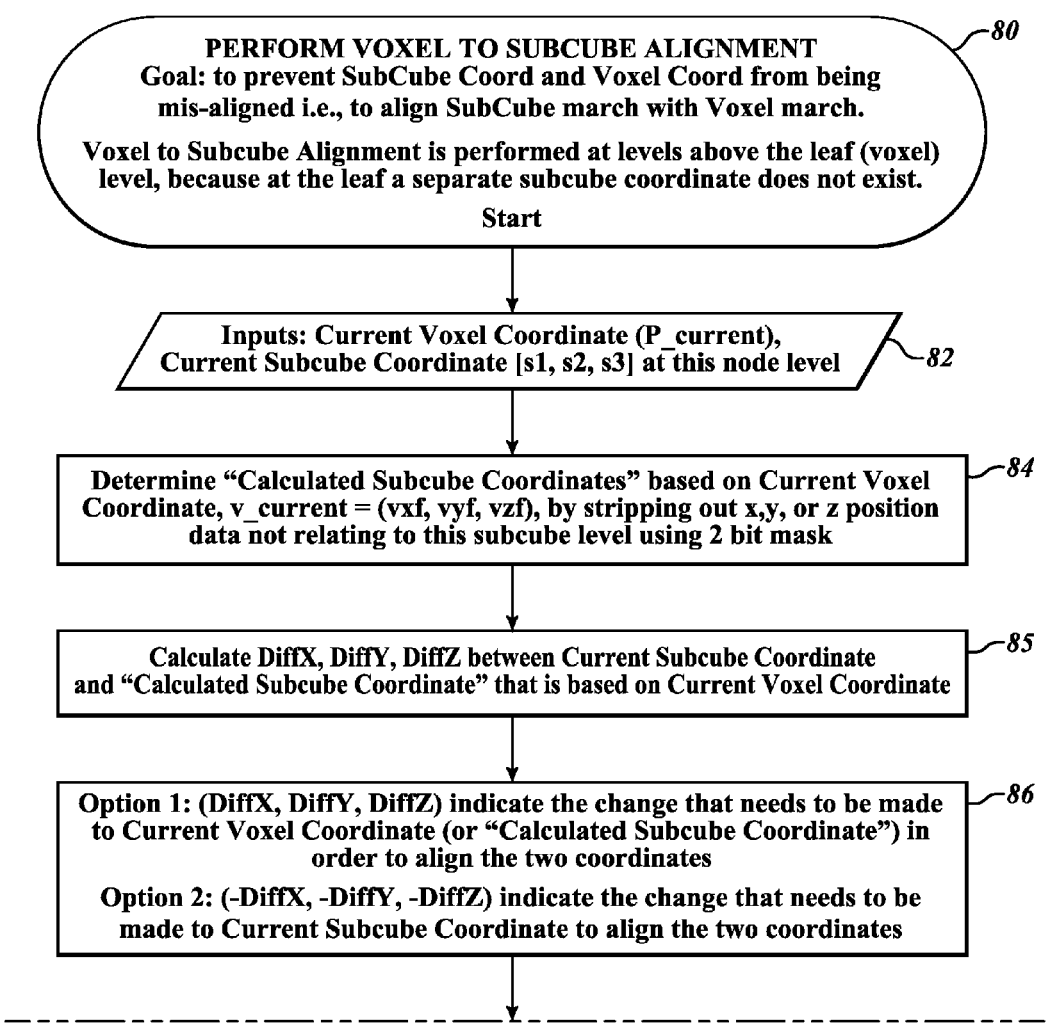
FIG. 6 is a flow chart illustrating a voxel-to-subcube alignment algorithm, which may be used as part of the ray marching algorithm of FIG. 4.

FIG. 6 is a flowchart illustrating a voxel (coordinate) to subcube (coordinate) alignment algorithm, which may be performed at block 70 of FIG. 4. One goal of the alignment is to prevent a subcube coordinate position and a voxel coordinate position from getting misaligned during the ray marching process. As each subcube level traverses through a finer and finer resolution, in order to achieve correct rendering results without visible artifacts, the inventors have discovered that it is technical advantageous to require each ray cast through a subcube to have at least +/−1 voxel accuracy. The voxel to subcube alignment process starts at block 80.

At block 82, inputs to the alignment process are received, which include the current marching voxel position P_current (cxf, cyf, czf) in the voxel coordinate system and the current subcube coordinate [s1, s2, s3] in the level-3 subcube coordinate system in the illustrated embodiment.

At block 84, a "calculated subcube coordinate" is determined based on the voxel position P_current, by stripping out x-, y- and z-position data not related to the level-3 subcube that is being considered. Referring additionally to FIG. 2, the voxel position P_current (cxf, cyf, czf) is illustrated as (33 22 11 00; 33 22 11 00; 33 22 11 00). As described above, "33" represents a value selected from 0, 1, 2 and 3, to indicate a level-3 subcube position along X-, Y- and Z-directions, respectively. Note that each of values 0, 1, 2 and 3 is represented as a decimal value with 2 bits—00, 01, 10 and 11, respectively. Thus, "33 22 11 00" in FIG. 2 represents 4 discrete locations of any of these 2-bit decimal values—00, 01, 10 and 11.

Similarly, "22" represents a value selected from 0, 1, 2 and 3, to indicate a level-2 subcube position along X-, Y- and Z-directions, respectively, within the level-3 subcube whose position was specified by values "33," and "11" represents a value selected from 0, 1, 2 and 3, to indicate a level-1 subcube position along X-, Y- and Z-directions, respectively, within the level-2 subcube whose position was specified by values "22." Finally, "00" represents a value selected from 0, 1, 2 and 3, to indicate a level-0 voxel position along X-, Y- and Z-directions, respectively, within the level 1 subcube whose position was specified by values "11."

As shown in FIG. 2, by applying a suitable 2-bit mask, the algorithm may extract the subcube coordinate of the current level (in the illustrated example, level 3). Specifically, by applying a 2-bit mask of "11 00 00 00" (logical AND) to each of X-, Y-, and Z-coordinates of P_current "33 22 11 00," the algorithm extracts "33 00 00 00" including only the coordinate "33" of level 3 in this example. Then, by shifting the bits to the right by 2× the current level (i.e., 3)=6 bits, the process may obtain "33," which is the coordinate of the current level (level 3).

At block 85, the process calculates DiffX, DiffY, and DiffZ, which are differences between the current subcube coordinate [s1, s2, s3] in the level-3 subcube coordinate system and the "calculated subcube coordinate" at the same level (level 3) along X-, Y-, and Z-directions, as calculated in block 84 above based on the current voxel position P_current.

If in block 86, if any of DiffX, DiffY, and DiffZ is found to be not zero, that means that the current subcube coordinate and the "calculated subcube coordinate" based on the voxel coordinate system are not aligned, and thus one needs to be adjusted to be aligned with the other. There are two options to achieve such alignment. Under Option 1, DiffX, DiffY, and DiffZ are used to indicate the change that needs to be made to the "calculated subcube coordinate" (based on the current voxel position P_current) so that it matches the current subcube coordinate. Under Option 2, on the other hand, −DiffX, −DiffY, and −DiffZ are used to indicate the change that needs to be made to the current subcube coordinate so that it matches the "calculated subcube coordinate" that is based on the current voxel position P_current.

Block 87 shows the actual change to be applied ("Result After Correction") to the "calculated subcube coordinate" (i.e., "Voxel Coord") to match the "Voxel Coord" to the subcube coordinate ("Subcube Coord") under Option 1. The following describes the details of how the change is calculated and made under Option 1, though the process of how the change is calculated and made under Option 2 will be merely reverse to that of Option 1 and thus apparent to those skilled in the art based on the following description.

As shown in Table 1 in block 87, DiffX, DiffY, and DiffZ calculated in block 85 above are shown in the third column "Diff." Note that Table 1 includes only the changes that need to be made to actually align the voxel coordinate to the subcube coordinate. For example, cases in which the "calculated subcube coordinate" is the same as the current subcube coordinate are not included in Table 1 because in those cases no change is needed. Similarly, cases in which DiffX, DiffY, or DiffZ is +2 or −2 are not included in Table 1 because an inclement (jump) by only +1 or −1 is allowed in performing the Bresenham walk. For the same reason, DiffX, DiffY, or DiffZ of +3 or −3 is also not allowed in the Bresenham walk, but it is determined that +3 and −3 may result from a wrap-around when crossing a subcube boundary from 3 of a first subcube to 0 of a second subcube (or from 0 of the second subcube to 3 of the first subcube). Thus, when the "calculated subcube coordinate" is 0 and the current subcube coordinate is 3, as in the 2$^{nd}$ row of Table 1, the current subcube coordinate is assumed to be 3 of a preceding subcube, instead of 3 of the current subcube. Accordingly, to match the "calculated subcube coordinate" of 0 to the subcube coordinate of 3 in the preceding subcube, an adjustment of −1, instead of Diff=3, should be applied. To that end, in Table 1, correction of −4 ("Correction Needed") is made to Diff=3 to result in the actual change to be made of −1 ("Result After Correction").

Therefore, when the "calculated subcube coordinate" is 0 and the current subcube coordinate is 3, as in the 2$^{nd}$ row of Table 1, the "Result After Correction" of −1 is applied to the "calculated subcube coordinate" ("Voxel Coord") so that it will match the current subcube coordinate.

Similarly, when the "calculated subcube coordinate" is 3 and the current subcube coordinate is 0, as in the 2$^{nd}$ from the last row of Table 1, the current subcube coordinate is assumed to be 0 of a next (subsequent) subcube, instead of 0 of the current subcube. Thus, to match the "calculated subcube coordinate" of 3 to the subcube coordinate of 0 in the next (subsequent) subcube, an adjustment of +1, instead of Diff=−3, should be applied. To that end, in Table 1, correction of 4 ("Correction Needed") is made to Diff+−3 to result in the actual change to be made of +1 ("Result After Correction"). Thus, when the "calculated subcube coordinate" is 3 and the current subcube coordinate is 0, as in the 2$^{nd}$ from the last row of Table 1, the "Result After Correction" of +1 is applied to the "calculated subcube coordinate" ("Voxel Coord") so that it will match the current subcube coordinate.

In all other cases as shown in Table 1, there is no "Correction Needed," and thus a "Duff" value is applied "as is" as the actual change to be made ("Result After Correction") to the "calculated subcube coordinate" (or "Voxel Coord" in Table 1).

In block 88, the actual adjustment value derived in block 87 above, as listed in the "Result After Correction" column of Table 1, is added to the "calculated subcube coordinate" ("Voxel Coord") of Table 1, under Option 1, to thereby align the "calculated subcube coordinate" with the current subcube coordinate ("SubCube Coord") in Table 1. Alternatively, under Option 2, the adjustment value derived in block 87 above, as listed in the "Result After Correction" column of Table 1, is subtracted from the current subcube coordinate ("Subcube Coord") of Table 1, to thereby align the current subcube coordinate with the "calculated subcube coordinate" ("Voxel Coord") of Table 1.

At this point, under either Option 1 or Option 2, the current subcube coordinate and the "calculated subcube coordinate," which is based on the voxel coordinate system, are fully aligned. Then, at block 89, an adjusted "calculated subcube coordinate" (under Option 1) or an adjusted current subcube coordinate (under Option 2) is outputted for further use in the subsequent ray marching process. At this point, the process returns to block 72 of FIG. 4.

At block 72, the algorithm checks whether the ray marching may continue within an allowed boundary. Specifically, the algorithm checks if t_current is equal to or within tStop, where tStop indicates a maximum allowed t value to remain within a defined clipping plane region being processed. The algorithm also checks whether the current subcube position [s1, s2, s3] is outside the allowed subcube range between [0, 0, 0] and [3, 3, 3]. That is, because each subcube has maximum 64 coordinate positions in the illustrated embodiment, if the ray marching results in the current subcube position to be outside the allowed subcube range, such as [0, 0, −1] or [4, 3, 3], the marching should be terminated.

In block 74, a decision is made whether the following three conditions are met. First, the valuable "numHits" is zero, meaning that no hit has been found yet. Second, t_current is inside the clipping plane region, that is, t_current tStop. Third, the current subcube coordinate [s1, s2, s3] is within [0,0,0] and [3,3,3].

In the illustrated example, when the ray marching has marched from the initial (and empty) level-3 subcube ⓪ to the adjacent level-3 subcube ① along Y direction (see white arrow "1" in FIG. 5), all of these 3 conditions are met. Thus, the algorithm returns to block 56, in which it is checked if the new level-3 subcube ①, which is now the current subcube, is occupied or not. If it is not occupied (i.e., if no hit is found), the algorithm traverses through the same steps 60-74 and continues looping through until an occupied level-3 subcube is found at block 56.

FIG. 5 shows the ray marching example from the current subcube ① to the next subcubes ②, ③, ④, and ⑤, in this order. The march from the subcube ① to the next subcube ② occurs along X direction because, in block 62, it is determined that the difference ΔX2 between t_current (which is tMax y at the white circle) and the next tMax x (the next black circle) is smaller than the difference ΔY2 between t_current and the next tMax y (the next white circle). Similarly, the march from the subcube ② to the next subcube ③ occurs again along X direction because, in block 62, it is determined that the difference ΔX3 between t_current (which is tMax x at the black circle) and the next tMax x (the next black circle) is again smaller than the difference ΔY3 between t_current and the next tMax y (the next white circle). The same marching algorithm is used to march from the subcube ③ to the next subcube ④ along Y direction, and then from the subcube ④ to the next subcube ⑤ along X direction.

Referring back to the ray marching flow chart of FIG. 4, at block 58, when it is determined that the current level-3 subcube is occupied (i.e., if a hit is found), the "numHits" at the current subcube level 3 is incremented by 1, and a Recursive Call is made to step through blocks 50, 52, 54, and 56 at the next lower level, i.e., level 2 in the illustrated example. For example, having found the current level-3 subcube to be occupied at block 58, the algorithm returns to block 52 to set P start fp (ixf, iyf, izf) and the ray start subcube position [s1, s2, s3] at the current subcube level 2. Similarly at block 54, the algorithm sets variable t_current, tMax x, tMax y, tMax z, and "numHits" (initially set to 0) as well as constants tStep x, tStep y, tStep z for the current subcube level 2. At block 56, a bit mask is applied to the current subcube (i.e., the starting one of 64 level-2 subcubes) included in the level-3 subcube found to be the occupied subcube. If the level-2 subcube is empty, the process keeps traversing through steps 60-74 at the current level 2 to perform the ray marching (as illustrated in FIG. 5) at level 2.

If, on the other hand, a level-2 subcube is found to be a hit (i.e., occupied), then the "numHits" at the current subcube level 2 is incremented by 1 and, at block 58, the Recursive Call is made to step through blocks 50-56 at the next lower level, i.e., level 1 in the illustrated example. At block 56, a bit mask is applied to the current subcube (i.e., the starting one of 64 level-1 subcubes) included in the level-2 subcube found to be the occupied subcube. If the level-1 subcube is empty, the process keeps traversing through steps 60-74 at the current level 1 to perform the ray marching (as illustrated in FIG. 5) at level 1.

If, on the other hand, a level-1 subcube is found to be a hit (i.e., occupied), then the "numHits" at the current subcube level 1 is incremented by 1 and, at block 58, the Recursive Call is made to step through blocks 50-56 at the next lower level, i.e., the lowest, leaf node (voxel) level 0. At block 56, a bit mask is applied to the current voxel (i.e., the starting voxel out of 64 level-0 voxels) included in the level-1 subcube found to be the occupied subcube. If the level-0 voxel is empty, the process keeps traversing through blocks 60, 62, 64, 66, 68, 72, and 74 (while skipping the alignment process block 70, which is not performed at the lowest voxel level) at the current level 0 to perform the ray marching (as illustrated in FIG. 5) at level 0.

If, on the other hand, a level-0 voxel is found to be a hit (i.e., occupied), then at block 58, the variable "numHits" at level 0 is incremented by 1 to count the occupied voxel, and the algorithm is returned from the Recursive Call back to block 60 to traverse blocks 60-74 at a higher level, i.e., level 1 in the illustrate example. Upon traversing through blocks 60-74 at level 1, at block 74, because "numHits"=1 at the subcube level 1 at this time, the conditions are not met and thus the algorithm proceeds to block 76 to return "numHits"=1 at the subcube level 1. At block 76, "numHits" values in higher levels (i.e., level 2 and level 3) may also be returned, together with the P_current (voxel coordinate) of the "hit" voxel counted in the "numHits" value. That is, block 76 returns the P_current (voxel coordinate) of the occupied "hit" voxel, based on which attribute values associated with the "hit" voxel may be retrieved for the purpose of rendering the 3D voxel data on a 2D screen.

In the embodiment illustrated above, block 74 determines whether numHits=0 or not, to force the algorithm to locate 1 hit before exiting the ray marching algorithm. In other embodiments, block 74 may determine, instead, whether numHits is less than 2, less than 3, etc., which forces the algorithm to locate 2 hits, 3 hits, and so forth, before exiting the ray marching algorithm.

As shown in FIG. 4, when a level-0 voxel is found to be a hit (i.e., occupied) and at block 58 the variable "numHits" is incremented by 1 to count the occupied voxel, the algorithm may alternatively proceed to block 61, which takes the algorithm directly to the decision block 74. At block 74, because "numHits"=1 at the subcube level 0 at this time, the conditions are not met and thus the algorithm proceeds to block 76 to return "numHits"=1 at the subcube level 0. At block 76, "numHits" values in higher levels (i.e., levels 1, 2 and 3) may also be returned, together with the P_current (voxel coordinate) of the "hit" voxel counted in the "numHits" value. That is, block 76 returns the P_current (voxel coordinate) of the occupied "hit" voxel, based on which attribute values associated with the "hit" voxel may be retrieved for the purpose of rendering the 3D voxel data on a 2D screen.

Figure 7:
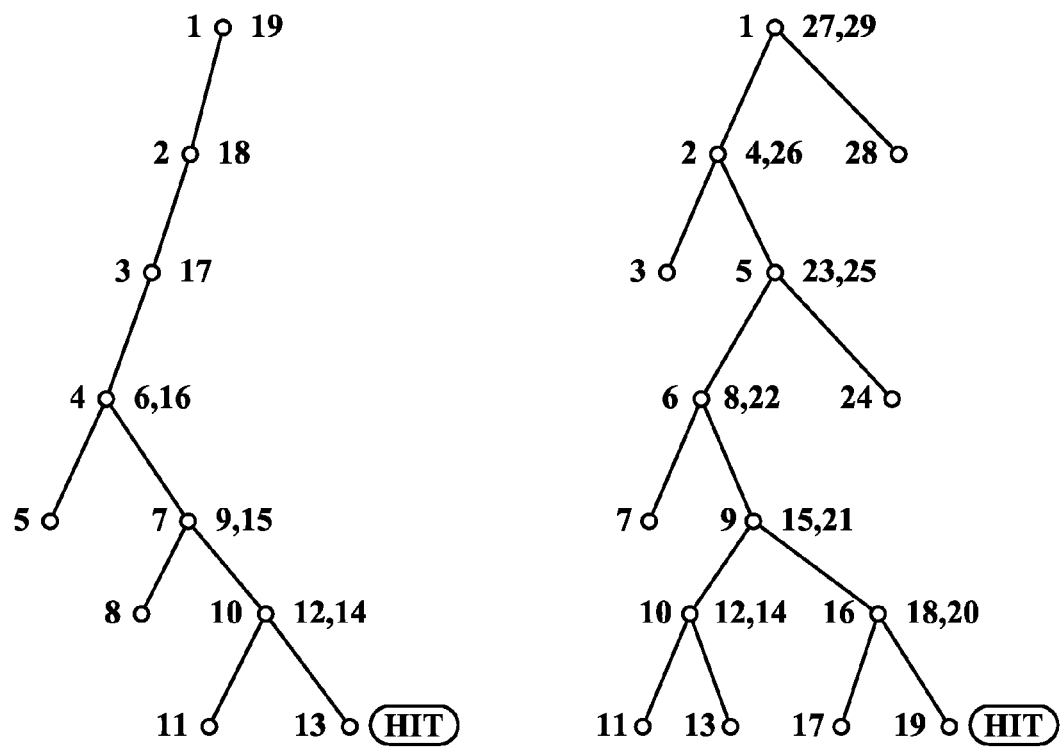
FIG. 7 is a diagram illustrating recursive voxel marching, which may be used in the ray marching algorithm of FIG. 4.

FIG. 7 illustrates two sample recursive voxel march paths, which may be followed using the ray marching algorithm disclosed above in reference to FIG. 4, for example. In the first example on the left, the march starts at a top level 6 (1), down to a level-5 node (2), down to a level-4 node (3), down to a level-3 node (4), down to a level 2-node (5), which is a dead-end (i.e., empty). The march then goes up to the level-3 node (6), down to another level-2 node (7), down to a level-1 node (8), which is a dead-end and thus the march goes back up to the level-2 node (9), down to another level-1 node (10), and down to a level-0 voxel (11), which is empty. The march thus goes back up to the level-1 node (12), down to another level-0 voxel (13) which is a hit (i.e., an occupied voxel). The march then goes up to the level-1 node (14), up to the level-2 node (15), up to the level-3 node (16), up to the level-4 node (17), up to the level-5 node (18), and finally up to the top level-6 node (19).

In the second example shown on the right, the march follows a path starting at a top level-6 node (1) to (2) through (19), which is a hit (occupied) voxel. From the hit level-0 voxel (19), the march goes up through (20), (21), (22) to reach the level-4 node (23). In this example, the ray march algorithm is configured such that the march can continue even after "numHits"=1 (i.e., two or more hits can be searched per each subcube level). Thus, from the level-4 node (23), the march goes down to a level-3 node (24), looking for another hit. The level-3 node (24) is a dead-end, so the march goes back up to the level-4 node (25), up to a level-5 node (26), and up to the top level-6 node (27). From the top level-6 node (27), the march continues down to another level-5 node (28), looking for another hit. The level-5 node (28) is a dead-end, so the march goes back up to the top level-6 node (29).

Alternatively to the embodiments of the rendering algorithm disclosed above, another rendering algorithm may involve use of pre-calculated ray marching paths. Specifically, a plurality voxel marching paths which respectively start at a certain initial voxel and end at a certain last voxel are pre-calculated and pre-stored in the memory. Then, the rendering algorithm includes generally two steps. First, an initial voxel in an initial subcube at which a ray of sight enters the set of 3D voxel data is selected, and a last voxel in a last subcube from which the ray of sight exits the set of 3D voxel data is selected. Second, one of the pre-stored plurality of voxel marching paths is selected based on the selected initial and last voxels. The selected voxel marching path is then used to render the 3D voxel data on a display.

Figure 8A:
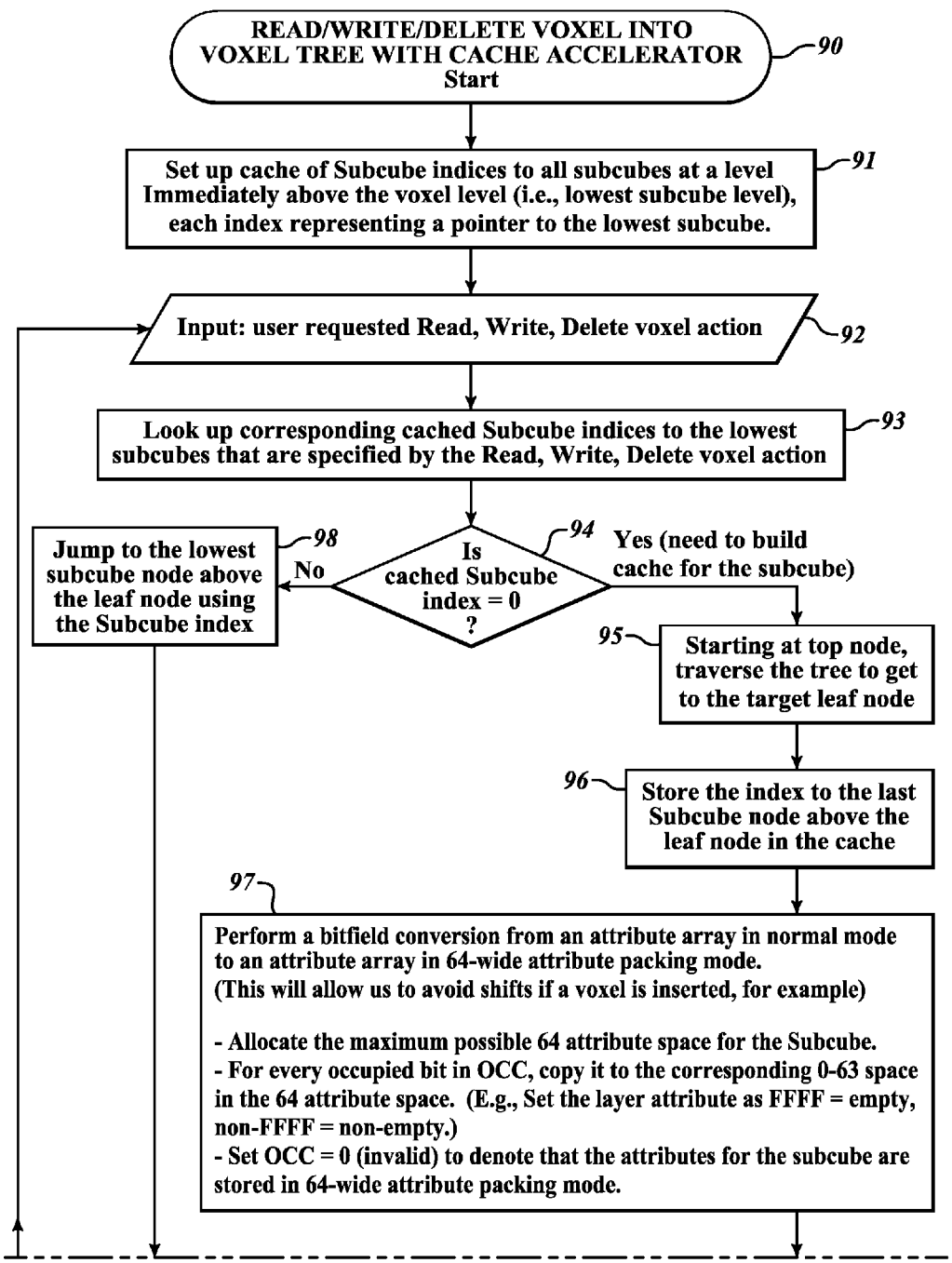
FIG. 8 is a flow chart illustrating an algorithm for reading, writing and deleting voxel data in a voxel tree structure according to embodiments of the present invention.
Figure 8B:
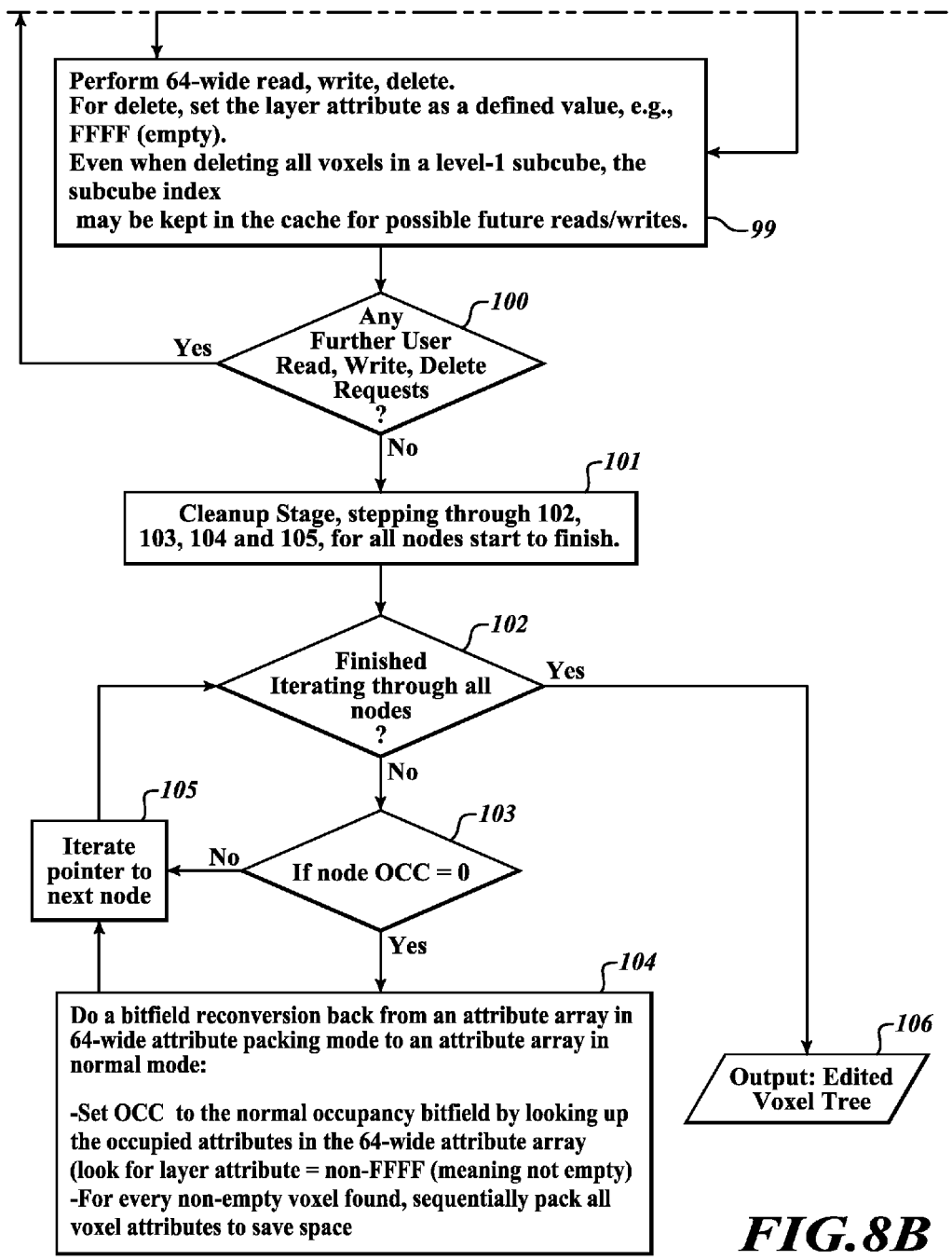
Figure 9:
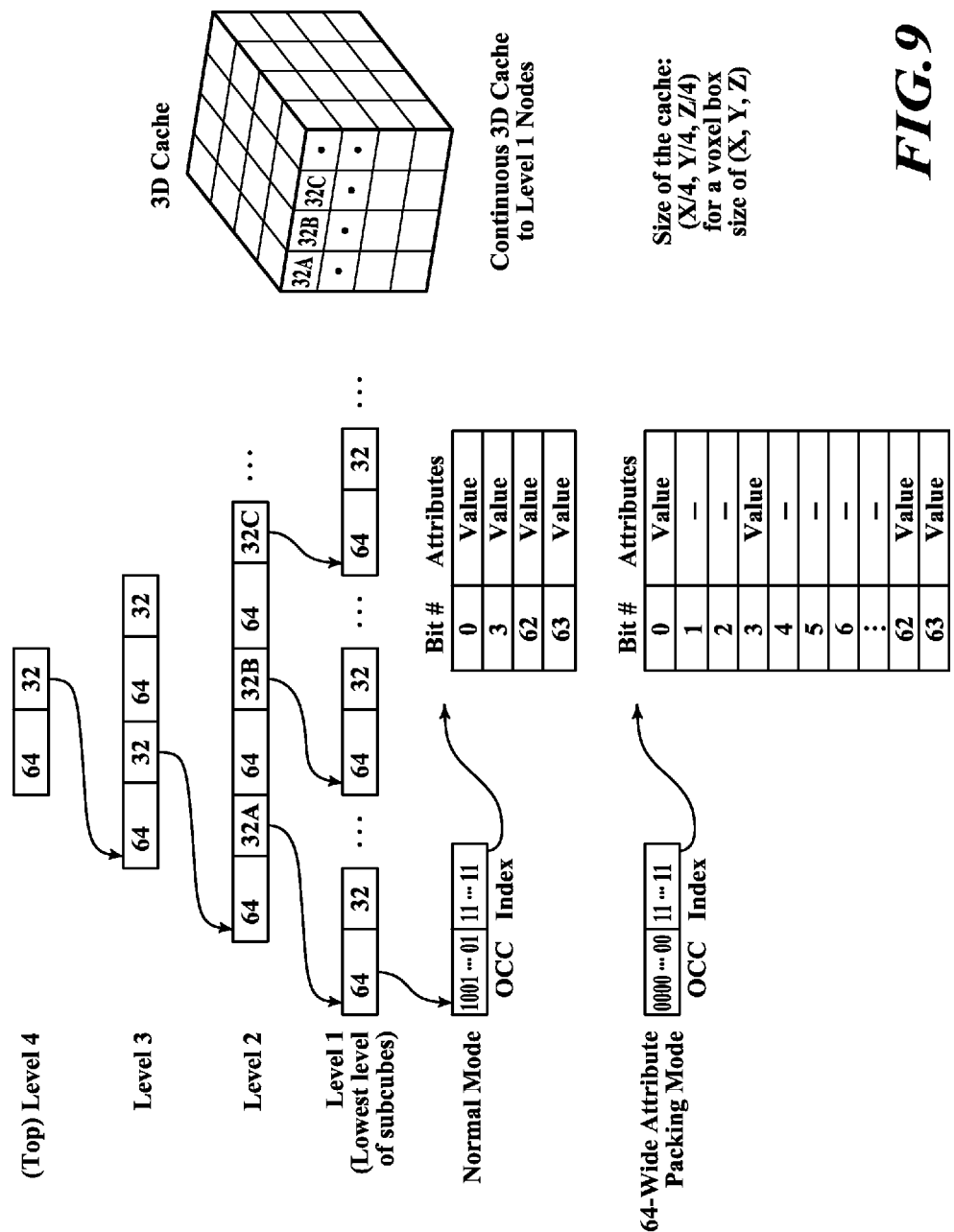
FIG. 9 is a diagram illustrating switching between normal mode, in which a node above the lowest node (i.e., a node above the voxel nodes) consists of 64 occupancy bits and 32 index bits as in FIG. 3, and 64-wide attribute packing mode, in which the node above the voxel nodes includes 64 memory locations for storing 64 attribute values of 64 voxels, respectively, according to embodiments of the invention.
Figure 10:
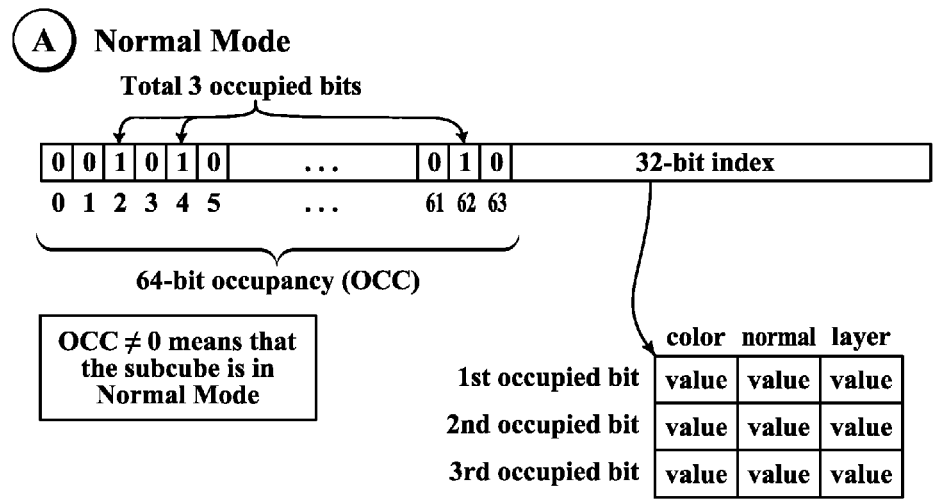
FIG. 10 is another diagram illustrating switching between the normal node and the 64-wide attribute packing mode, as illustrated in FIG. 9.
Figure 10:
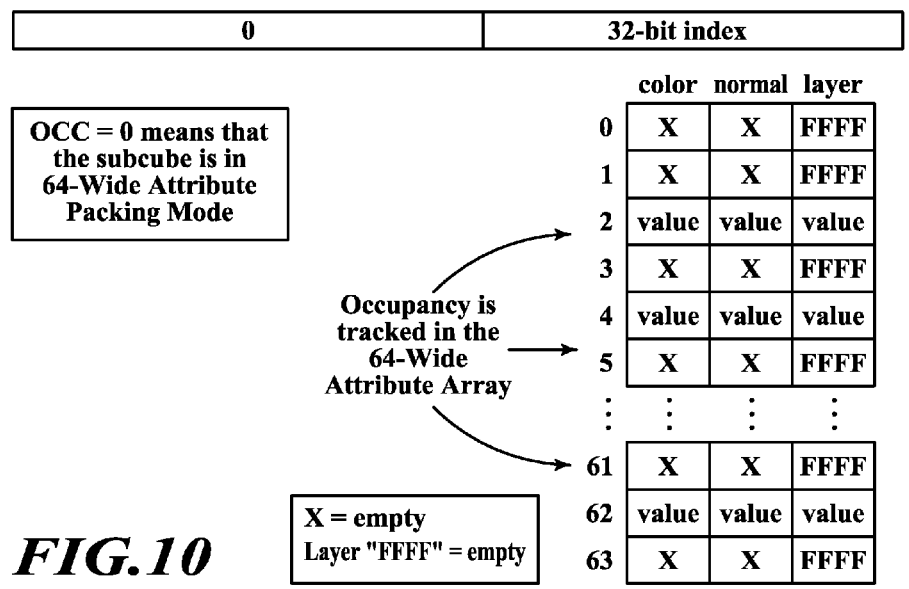

Next, a system and a method to speed up the editing process (e.g., read/write/delete) of the 3D voxel data arranged as disclosed above are described in reference to FIGS. 8-10.

FIG. 8 is a flow chart of an algorithm of performing a read/write/delete process rapidly by use of a 3D cache accelerator, which is a collection of indices pointing directly to memory locations of the lowest level of subcubes (mid-level nodes) immediately above the lowest voxel level, each of which is associated with a 32-bit pointer pointing to attributes of occupied voxels included in the subcube. Use of the 3D cache accelerator makes it unnecessary for the read/write/delete process to have to traverse from the top level node down through multiple middle level nodes to reach the lowest-level middle node, which is immediately above the leaf (voxel) node level, when performing read/write/delete.

The read/write/delete voxel algorithm, which reads, writes and deletes voxel data in a 3D voxel tree data structure starts at a block 90. At block 91, a 3D cache is set up that includes subcube indices to all subcubes at the lowest level of subcubes, i.e., level-1 subcubes that are immediately above the leaf (voxel) node level. Each of the subcube indices represents a pointer to the corresponding level-1 subcube. Therefore, the cache size for a voxel box of dimension (x, y, z) would be (x/4, y/4, z/4) because that is the resolution of the subcube size at the corresponding level 1 for a (4×4×4) subcube.

Note that it is also possible to set up a similar cache for other levels of the tree above the leaf nodes, such as to level-2 subcubes, level-3 subcubes, etc.

The subcube indices are initially all set to 0. FIG. 9 shows a 3D cache including 64 subcube indices to respectively point to 64 subcubes at level 1.

At block 92, user command is inputted which requests Read, Write, or Delete a voxel in the 3D voxel data.

At block 93, the algorithm looks up the corresponding cached subcube index, which points to the level-1 subcube that is specified by the Read, Write, Delete user command.

At block 94, it is determined whether the looked-up subcube index is 0 or not. If 0, it means that the subcube index for the level-1 subcube is not yet defined and needs to be built.

Then, at block 95, starting at a top node (level 4, in the illustrated example), the 3D voxel tree is traversed to get to the target leaf (voxel) node to be read/written/deleted.

Referring additionally to FIG. 9, the algorithm traverses from the top level-4 node, using its 32 index bits, to level-3 nodes. The algorithm then traverses from the first level-3 node, using its 32 index bits, to level-2 nodes. The algorithm traverses from the first level-2 node, using its 32 index bit, to level-1 nodes, which are the lowest-level subcube nodes immediately above the target level-0 voxel nodes.

At block 96, the index to the lowest-level subcube node of interest is stored in the 3D cache. FIG. 9 illustrates that the subcube indices 32A, 32B and 32C, which respectively point to the lowest-level subcubes at level 1, are stored in the 3D cache.

At block 97, each of the lowest-level (level-1) subcubes, which are to be edited and whose subcube indices are now stored in the 3D cache, is subjected to a bitfield conversion process. Specifically, an attribute array in normal mode for the level-1 subcube, as shown in FIG. 3, is converted to an attribute array in 64-wide attribute packing mode, which is more suitable for allowing rapid voxel editing (read/write/delete).

FIG. 9 shows a sample attribute array in NORMAL MODE and a sample attribute array in 64-WIDE ATTRIBUTE PACKING MODE. In NORMAL MODE, the level-1 subcube node includes 64 occupancy (OCC) bits ("1001 . . . 11") and 32 index (INDEX) bits ("11 . . . 11"). As described above in reference to FIG. 3, the 64 occupancy bits indicate an occupied or empty state of each of 64 voxels included in the level-1 subcube, while the 32 index bits point to a memory location of the attribute array for only the occupied voxels (the $0^{th}$, $3^{rd}$, $62^{nd}$ and $63^{rd}$ voxels in the illustrated example) included in the level-1 subcube. As described above, an attribute array in NORMAL MODE is efficient in term of memory usage.

On the other hand, in 64-WIDE ATTRIBUTE PACKING MODE, the level-1 subcube node still includes 64 occupancy (OCC) bits but all 64 bits are set to 0 to indicate that the level-1 subcube node (having all 0 occupancy bits) is in 64-WIDE ATTRIBUTE PACKING MODE. The level-1 subcube also includes 32 index (INDEX) bits that point to a memory location of an attribute array, which is 64-bit wide to be able to store attribute values for all 64 voxels included in the level-1 subcube. In the illustrated example, only the $0^{th}$, $3^{rd}$, $62^{nd}$ and $63^{rd}$ voxels are occupied and thus are associated with attributes. Thus, the 64-bit wide array includes attribute values for only the $0^{th}$, $3^{rd}$, $62^{nd}$ and $63^{rd}$ voxels, while "NULL" values are stored for the rest of the voxels in the subcube (indicated by "–" in FIG. 9). Thus, unlike the attribute array in NORMAL MODE, the attribute array in 64-WIDE ATTRIBUTE PACKING MODE is not compact and thus is not efficient in terms of memory usage, but is suitable to allow easy access to respective attributes of all 64 voxels during an editing process (read/write/delete). For example, use of 64-WIDE ATTRIBUTE PACKING MODE allows for avoiding shifts in memory when inserting a new occupied voxel in the 3D voxel data set.

FIG. 10 illustrates further details of NORMAL MODE vs. 64-WIDE ATTRIBUTE PACKING MODE. In the illustrated example of NORMAL MODE, the 64 occupancy bits indicate that three voxels at the $2^{nd}$ $4^{th}$, and $62^{nd}$ positions of the level-1 subcube are occupied, and the 32 index bits point to a memory location of an attribute array, in which attribute values (color, normal, layer) of those three occupied voxels are stored contiguously and in an aligned manner. As used herein, a "layer" attribute means an attribute that indicates which part of a 3D object (for example, an engine part or a wing part of a 3D airplane object) the voxel belongs to. As illustrated in FIG. 10, the color, normal, and layer attributes for each occupied voxel are aligned, to thereby permit easy and rapid access to all of the attributes for each occupied voxel. In the illustrated example of NORMAL MODE, the 64 occupancy bits are "001010 . . . 010" and not zero. In other words, if the 64 occupancy bits are not zero (not all 0s), the subcube in issue is assumed to be stored in NORMAL MODE.

Still referring to FIG. 10, in the illustrated example of 64-WIDE ATTRIBUTE PACKING MODE, the 64 occupancy bits are zero (all 0s) to indicate that the subcube in issue is stored in 64-WIDE ATTRIBUTE PACKING MODE. Then, the 32 index bits point to a memory location of an attribute array, which is 64-wide in memory space and thus is capable of storing attribute values for all 64 voxels within the subcube, respectively. The attribute array in 64-WIDE ATTRIBUTE PACKING MODE in FIG. 10 results from performing a bit conversion of the attribute array in NORMAL MODE in FIG. 10. That is, the attribute array in 64-WIDE ATTRIBUTE PACKING MODE stores the same attribute values for the same three occupied voxels in the $2^{nd}$ $4^{th}$, and $62^{nd}$ positions of the level-1 subcube, respectively, but within the 64-wide attribute array instead of within the compact attribute array used in NORMAL MODE. In the 64-wide attribute array in 64-WIDE ATTRIBUTE PACKING MODE, "NULL" values may be stored for each of the non-occupied voxels (indicated as "X" in FIG. 10). In some embodiments, for non-occupied voxels, a predefined value such as "FFFF" (hexadecimal) may be stored as a "layer" attribute value because "FFFF" is rarely used as an actual layer attribute value. Then, "FFFF" found as a layer attribute value may be interpreted to indicate that the corresponding voxel is a non-occupied (empty) voxel. In other words, a layer attribute value set as non-FFFF value indicates that the corresponding voxel is occupied.

Returning back to FIG. 9, after the attribute array is bitfield-converted from that in NORMAL MODE to that in 64-WIDE ATTRIBUTE PACKING MODE in block 97, in block 99, the algorithm performs the read, write, delete process as commanded by the user in the 64-wide attribute array. To delete a voxel, for example, the algorithm may simply set a layer attribute value for the voxel as "FFFF" as opposed to having to convert each and every attribute value of the voxel to a NULL value. Even when all voxels are deleted in a given level-1 subcube, the subcube index to that level-1 subcube may be kept in the 3D cache for possible future read/write operations.

In block 100, it is determined whether any further read, write, or delete request is pending. If yes, the algorithm returns to block 92 and loops through blocks 93-100 until there are no more read/write/delete requests to be acted upon.

Back in block 94, if it is determined that the looked-up subcube index is not 0, it means that the subcube index for that level-1 subcube has already been defined. Then, at block 94, the algorithm jumps to the lowest subcube level, which is immediately above the leaf node level, using the looked-up subcube index. Then, at block 99, the algorithm performs the read/write/delete process as commanded by the user in the 64-wide attribute array in 64-WIDE ATTRIBUTE PACKING MODE. In block 100, it is determined whether any further read/write/delete requests are pending. If yes, the algorithm returns to block 92 and loops through blocks 93-100 until there are no more read/write/delete requests to be acted upon.

If, in block 100, it is determined that there are no further read/write/delete requests to be acted upon, in block 101, the algorithm starts to step through the following blocks 102-105, to essentially convert the attribute array from that in 64-WIDE ATTRIBUTE PACKING MODE back to that in NORMAL MODE.

In block 102, it is determined whether all relevant nodes, i.e., the level-1 subcube nodes at the level immediately above the voxel node level, have been iterated through (i.e., converted back).

If not, in block 103, it is determined whether the 64 occupancy bits of the level-1 subcube being considered are all zeros. If yes, it means that the level-1 subcube is stored in 64-WIDE ATTRIBUTE PACKING MODE. (See FIG. 10.) Then, proceeding to block 104, the algorithm performs a bitfield conversion to convert the attribute value in 64-WIDE ATTRIBUTE PACKING MODE back to the corresponding attribute value in NORMAL MODE. Specifically, the 64 occupancy bits are converted from all zeros to those that indicate the occupied ("1") or empty ("0") state of each of 64 voxels included in the subcube, by looking up the occupied attributes in the 64 wide attribute array. The occupied attributes (voxels) may be rapidly identified by looking for layer attributes that are not "FFFF." For every non-empty voxel found, the algorithm sequentially packs all attributes in an aligned manner to save memory space.

Then, in block 105, a pointer that points to the level-1 subcube to be considered is incremented, and the algorithm returns to block 102, where it is determined whether all relevant level-1 subcube nodes have been cleaned up, i.e., if there is any more level-1 subcube to be bitfield-converted. If there is such level-1 subcube, the algorithm cycles through blocks 103, 104, and 105 to continue converting the next level-1 subcube.

In block 103, if it is determined that the 64 occupancy bits of the level-1 subcube being considered is not zero, then it means that the subcube is already stored in NORMAL MODE (see FIG. 10). Then, the algorithm proceeds to block 105, where the pointer that points to the level-1 subcube to be considered is incremented, and the algorithm returns to block 102, where it is again determined whether all level-1 subcubes have been converted back. If it is determined that all level-1 subcubes have been converted, i.e., have been stored in NORMAL MODE, then the algorithm proceeds to block 106, which then outputs the edited voxel tree data structure, as stored in NORMAL MODE.

Figure 11:
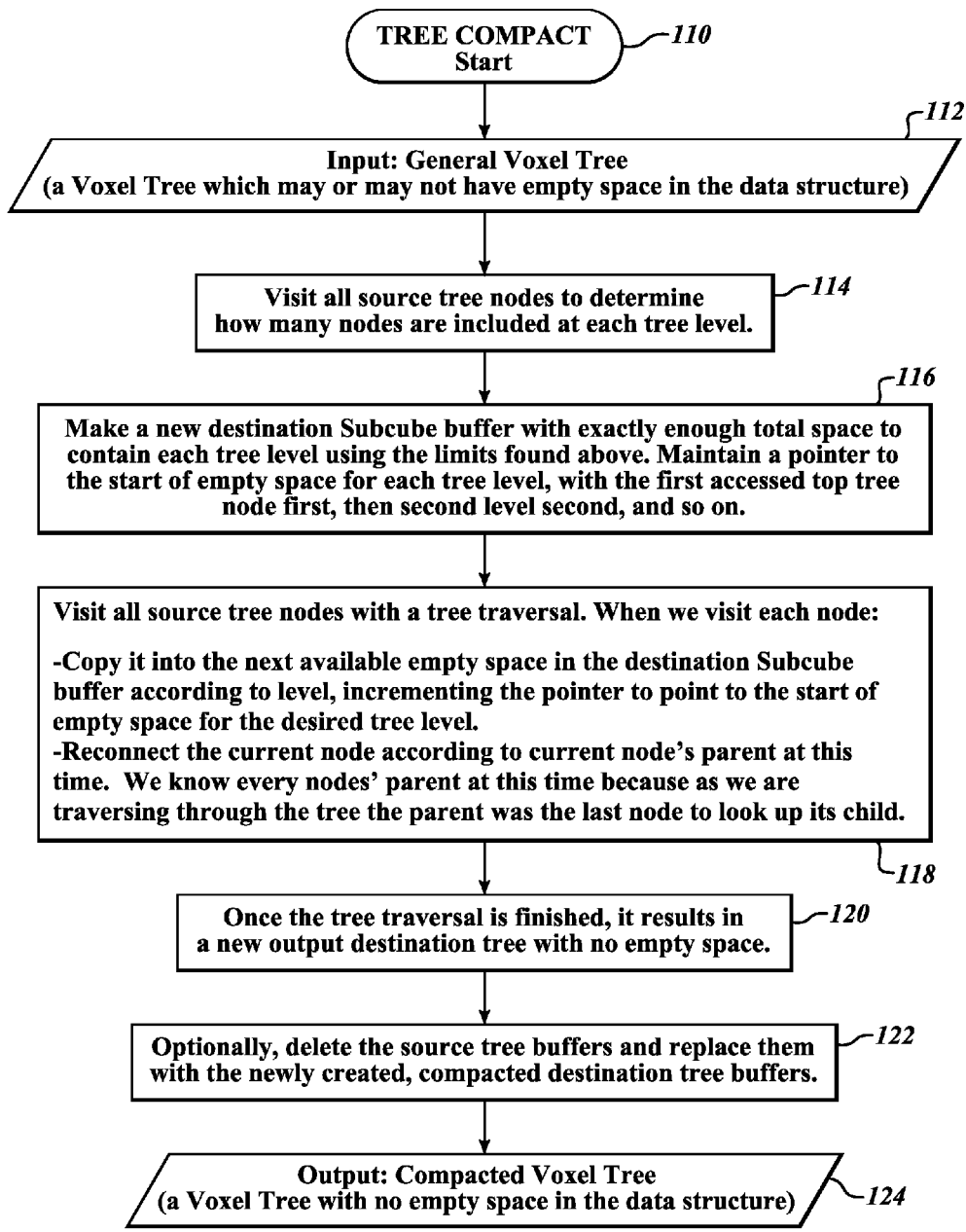
FIG. 11 is a flow chart illustrating a tree compact algorithm, which may be used to compact a 3D voxel tree data after it is built, according to embodiments of the present invention.
Figure 12:
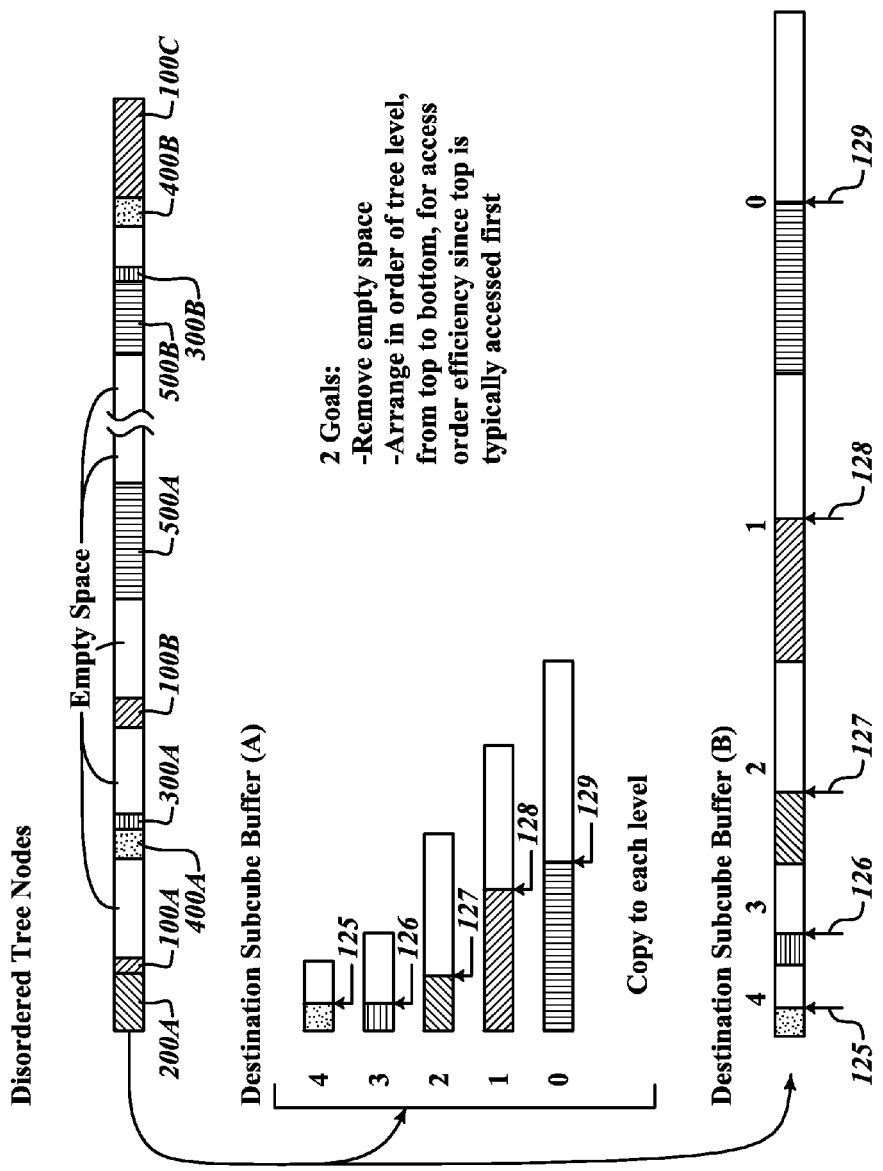
FIG. 12 is a diagram illustrating ordering "disordered" tree nodes into an ordered structure, according to the tree compact algorithm of FIG. 11.

FIG. 11 is a flow chart illustrating a tree compact algorithm, which may be used to compact a 3D voxel tree data after it is built. FIG. 12 is a diagram illustrating a process of compacting a tree data structure which includes empty space, according to the algorithm of FIG. 11.

The "tree compact" algorithm starts at block 110 of FIG. 11.

At block 112, the algorithm receives as input a "source" voxel tree structure, which may be orderly (compacted) or not orderly and have empty space in the data structure.

In block 114, the algorithm visits all tree nodes of the source voxel tree structure, from the top level (e.g., level 4) to the lowest level (level 0), to thereby determine how many nodes are included at each tree level. For example, referring additionally to FIG. 12, the algorithm visits all five levels (levels 4-0) of the source voxel tree structure consisting of disordered tree nodes. The disordered tree nodes of FIG. 12 include: a level-2 node (200A), followed by a level-1 node (100A), followed by empty space, followed by a level-4 node (400A), a level-3 node (300A), another empty space, another level-1 node (100B), yet another empty space, a level-0 node (500A), another empty space, another level-0 node (500B), another level-3 node (300B), another empty space, another level-4 node (400B), and another level-1 node (100C).

In block 116, the algorithm creates a new destination subcube buffer with exactly enough total space to contain all nodes at each tree level, using the limits found in block 114 above. The algorithm maintains a pointer to the start of empty space for each tree level. For example, in the illustrated example of compacting the 5-level tree structure (levels 4-0), five separate pointers are provided, with the first pointer pointing to the start of empty space at the top level 4, the second pointer pointing to the start of empty space at level 3, the third pointer pointing to the start of empty space at level 2, the fourth pointer pointing to the start of empty space at level 1, and the fifth pointer pointing to the start of empty space at level 0.

At block 118, the algorithm visits all disordered tree nodes in the source voxel tree structure with a tree traversal. When visiting each node, the algorithm copies the node into the next available empty space in the destination subcube buffer at the corresponding level, and increments the corresponding pointer to point to the (new) start of empty space at that level. For example, referring additionally to FIG. 12, the algorithm copies the level-2 node (200A) from the source voxel tree structure onto the next available empty space at level 2 in the destination subcube buffer (A) or (B), and increments the corresponding pointer 127 to point to the start of empty space at level 2. In FIG. 12, the destination subcube buffer (A) is the same as the destination subcube buffer (B), but the destination subcube buffer (A) illustrates five levels of buffer portions in separate lines for clarity only.

Similarly, the algorithm copies the level-1 node (100A) from the source voxel tree structure onto the next available empty space at level 1 in the destination subcube buffer (A) or (B), and increments the corresponding pointer 128 to point to the next starting point of empty space at level 1. The algorithm then copies the level-4 node (400A) from the source voxel tree structure onto the next available empty space at level 4 in the destination subcube buffer (A) or (B), and increments the corresponding pointer 125 to point to the next starting point of empty space at level 4. The algorithm next copies the level-3 node (300A) from the source voxel tree structure onto the next available empty space at level 3 in the destination subcube buffer (A) or (B), and increments the corresponding pointer 126 to point to the next starting point of empty space at level 3. The algorithm next copies the level-0 node (500A) from the source voxel tree structure onto the next available empty space at level 0 in the destination subcube buffer (A) or (B), and increments the corresponding pointer 129 to point to the next starting point of empty space at level 0. The algorithm continues to copy all of the nodes in the disordered tree nodes onto the destination subcube buffer (A) or (B).

At block 120, once the tree traversal is finished, the destination subcube buffer (A) or (B) is now fully populated, i.e., a new destination voxel tree structure with no empty space is created.

At block 122, optionally, the algorithm deletes the source voxel tree structure (i.e., source subcube buffers) at this time, and replaces it with the newly created destination voxel tree structure.

At block 124, the algorithm outputs the compacted destination voxel tree structure with no empty space.

In accordance with some embodiments, it is desirable to combine several source sets of 3D voxel data into a single summary set of 3D voxel data arranged in the same 64-tree data structure, wherein the several source sets of 3D voxel data represent 3D objects which will be joined together to form a combined, summary 3D object in the context of the tree data structure.

It is possible to grow the box size of the summary 3D voxel set large enough to enclose all of the 3D space occupied by every voxel contained in the box size of each of the source 3D voxel sets, by transforming the box size of each of the source 3D voxel sets into 3D box bounds of the summary set of 3D voxel data in a 3D space of the summary set and enlarging the 3D box bounds of the summary set to fit.

Then it is possible to write the voxels contained in each source 3D voxel set into the summary 3D voxel set by transforming each voxel location into the 3D space of the summary set, thereby creating a summary voxel set containing the data of several source voxel sets which can be rendered more efficiently as a single tree data structure covering a single volume space, compared to several tree data structures covering the same voxel space.

Creation of such single 64-tree data is advantageous, for example, when multiple objects are respectively represented by multiple sets of 3D voxel data and the multiple objects together form one combined object. Then a top combination node may be added above the multiple sets of 3D voxel data to create a single 64-tree data structure. For example, when a cup and a saucer are respectively represented by two sets of 3D voxel data, then a top combination node may be added above the two sets of 3D voxel data representing the cup and saucer, to form a single 64-tree data structure having the combination node as the top node. Creation of such single 64-tree data is advantageous for the purpose of traversal efficiency and rendering efficiency.

In accordance with further embodiments, when a rendering speed of the 3D voxel data does not meet a predefined threshold speed, the rendering algorithm reduces a maximum depth of nodes to which the 64-tree data structure is traversed, until the rendering speed meets the predefined threshold speed. By reducing the tree traversal depth, the algorithm reduces the number of nodes to traverse, to thereby speed up the traversal process (until finding a first hit).

In accordance with further embodiments, when a level of detail that can be rendered at a tree level higher than the leaf node level equals or exceeds a level of detail achievable (displayable) with a particular resolution of the display, the algorithm stops traversing the 64-tree data structure at that level higher than the leaf node (instead of traversing the 64-tree data structure all the way down to the leaf nodes). In other words, the algorithm stops traversing the 64-tree data structure beyond a tree level at which further traversal will not make any difference in the resolution or quality of the image as rendered on the display.

In accordance with other embodiments, nodes including the top node all the way down to the middle nodes at a tree level immediately above the leaf nodes are stored in one section of the memory, and the leaf (bottom) nodes are stored in another section of the memory.

Figure 13:
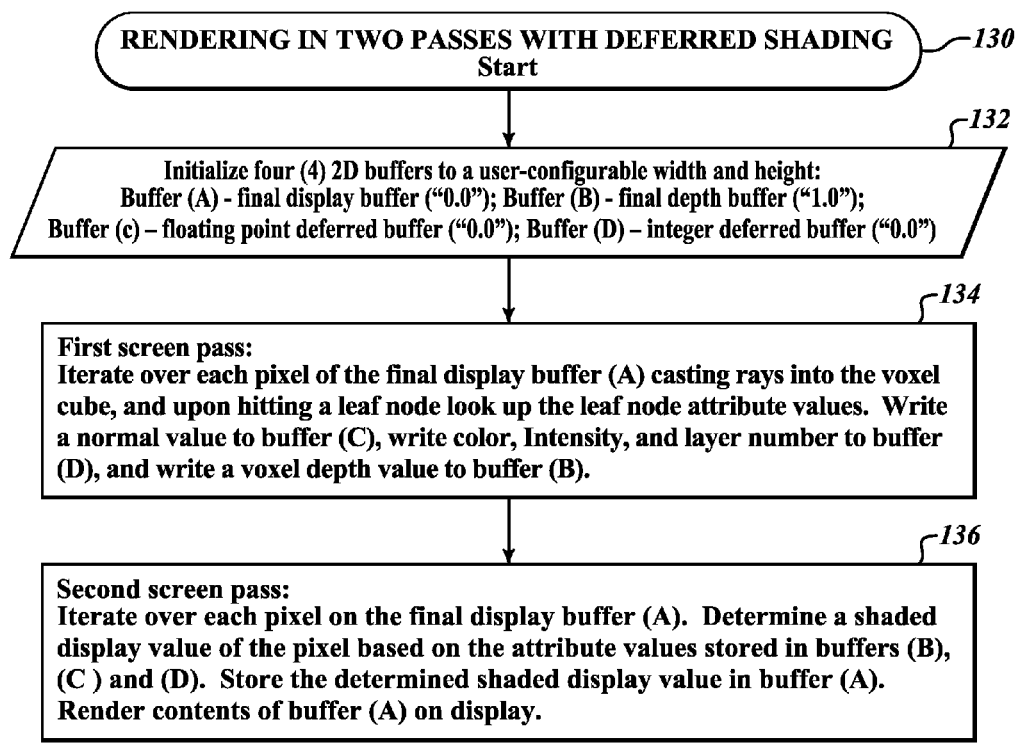
FIG. 13 is a flow chart illustrating a two-pass rendering algorithm, which may be used in accordance with some embodiments of the present invention.

In accordance with further embodiments, rendering can be performed in multiple passes. FIG. 13 is a flow chart illustrating an algorithm which may be used to perform multiple-pass (e.g., two-pass) rendering. In block 130, an algorithm to render a set of 3D voxel data on a display in two passes (with deferred shading) is started.

Initialization:

Block 132 is an initialization block, in which four (4) 2D buffers are initialized to a user-configurable width and height. In exemplary embodiments, the following four buffers are initialized:

Buffer (A), which is a final display buffer. Its element is a single 32 bit integer value.

Buffer (B), which is a final depth buffer. Its element is a single 32 bit floating point value.

Buffer (C), which is a floating point deferred buffer. Its elements are four 32 bit floating point values.

Buffer (D), which is an integer deferred buffer. Its elements are four 16 bit integer values.

In exemplary embodiments, buffers (A), (C), and (D) are initialized to an initial value of 0.0. Buffer (B) is initialized to an initial value of 1.0.

First Screen Pass:

In block 134, the algorithm carries out a first screen pass rendering routine. The algorithm iterates over each pixel of the final display buffer (A) casting rays into the set of 3D voxel data (i.e., the voxel cube). Upon hitting a leaf node, the algorithm looks up the attribute values of the leaf node, which are stored in voxel attribute arrays, using the index as described above in reference to FIG. 3. In the illustrated embodiment, the attribute values include a normal value, a color value, an intensity value, a layer number, and a voxel depth value.

In the illustrated embodiment, the algorithm writes the x, y, and z components of the normal into three of the four elements of the floating point deferred buffer (C).

The algorithm writes a color value, an intensity value, and a leaf layer number into three of the four elements of the integer deferred buffer (D).

The algorithm writes a voxel depth value to the final depth buffer (B).

Second Screen Pass:

In block 136, the algorithm carries out a second screen pass rendering routine. The algorithm iterates over each pixel of the final display buffer (A) and calculates a shaded display value of the pixel with a user-selectable shading program.

The shading program uses the corresponding stored attribute values from the three buffers (B), (C) and (D) to determine a shaded display value, i.e., the color and amount of light, of the voxel at that pixel.

The shading program may consist of industry standard techniques such as the Cook-Torrance and Blinn-Phong lighting algorithms, other modes for transparency and/or intensity rendering, and further visualization modes.

The determined shaded display value at each pixel is stored in buffer (A), and the algorithm finally renders the contents of buffer (A) on the display.

Figure 14:
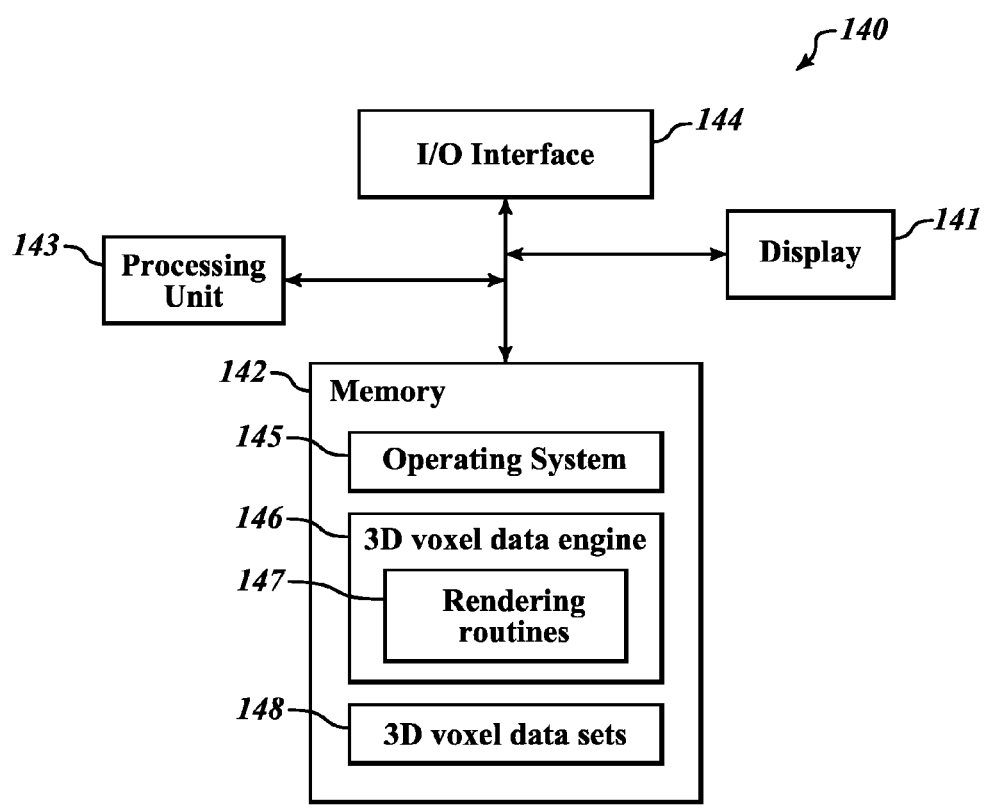
FIG. 14 is a block diagram of several components of a computing device suitable for executing various algorithms according to exemplary embodiments of the present invention.

FIG. 14 is a block diagram illustrating several of the key components of a computing device 140, which may be used as a system to execute various 3D voxel data rendering and other related algorithms according to various embodiments of the present invention. Those skilled in the art will appreciate that the computing device 140 may include many more components than those shown in FIG. 14. However, it is not necessary that all of these generally conventional components be shown in order to disclose an enabling embodiment for practicing the invention. As shown in FIG. 14, the computing device 140 includes a display 141, a memory 142, a processing unit 143, and an input/output ("I/O") interface 144, all interconnected via a bus. The display 141 is typically an LCD screen and may be a touch sensitive display in some embodiments. The processing unit 143 is preferably a 64-bit processor thought other types of processors may also be used. The I/O interface 144 is provided for connection to other devices, such as an computer-readable medium, external storage or a network (not shown), from which 3D voxel data sets and/or computer-executable instructions embodying various rendering algorithms may be loaded onto the computing device 140 (or the memory 142). The I/O interface 144 includes the necessary circuitry for such a connection and is constructed for use with the necessary protocols, as will be appreciated by those skilled in the art. The computer-readable medium may be USB memory devices, SD cards, optical disks, and other portable memory devices that are currently available and may be available in the future.

The memory 142 generally comprises a random access memory ("RAM"), a read-only memory ("ROM"), a permanent mass storage device, a hard disc drive, tape drive, floppy disc drive, optical disc drive, magneto-optical disc drive, flash memory drive (e.g., USB flash drive), drum memory, or combination thereof, and may also include a removable memory device. The memory 142 also includes cache and registers of, or accessible by, the processing unit 143. The memory 142 stores an operating system 145, a 3D voxel data engine 146 which is a set of computer-executable instructions configured to generate and process (e.g., manipulate, render or display) 3D voxel data, and a database 148 for storing sets of 3D voxel data. The 3D voxel data engine 146 includes 3D voxel set rendering routine(s) 147 configured to execute various 3D voxel set rendering algorithms as disclosed above.

Although the exemplary computing device 140 has been described that generally conforms to a conventional computing device, those skilled in the art will appreciate that the computing device 140 may be any of a great number of devices capable of executing various algorithms disclosed above according to the present invention. In various exemplary embodiments, the computing device 140 does not require specialized hardware. Rather, a standard processor (e.g., a 64-bit processor) is sufficient, as used in a typical desktop or laptop computer or in a mobile device such as a tablet device. Further, a constrained memory, i.e., a limited amount of memory relative to a typical computer graphics rendering system, may be sufficient in most applications.

The various embodiments described above can be combined to provide further embodiments. All of the U.S. patents, international patent applications and non-patent publications referred to in this specification are incorporated herein by reference, in their entirety. Aspects of the embodiments can be modified, if necessary, to employ concepts of the various patents, applications and publications to provide yet further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A computer-implemented system comprising:
 a display;
 a memory which, in operation, is loaded with a set of 3D voxel data arranged in a $N^3$-tree data structure where N is a positive integer, the $N^3$-tree data structure including:
  a top node representing a cube and including 64 occupancy bits and 32 index bits, an occupied or empty state of each of 64 subcubes in the cube being indicated by 1 occupancy bit of the 64 occupancy bits, and the 32 index bits representing a first pointer to a memory location of middle nodes,
  the middle nodes representing M occupied subcubes, respectively, each including 64 occupancy bits and 32 index bits, an occupied or empty state of each of 64 voxels in the occupied subcube being indicated by 1 occupancy bit of the 64 occupancy bits, and the 32 index bits representing a second pointer to a memory location of leaf nodes in the occupied subcube, wherein M is a positive integer, and
  the leaf nodes respectively representing N occupied voxels in the occupied subcube, each leaf node including an index number to be combined with the second pointer to point to a memory location of at least one type of attribute value of the occupied voxel, wherein N is a positive integer; and
 a processor which is coupled to the display and the memory and which, in operation, renders the set of 3D voxel data on the display.

2. The system of claim 1, wherein the processor, in operation, renders the 3D voxel data on the display by executing a volume ray marching algorithm to compute a 2D image of the set of 3D voxel data, the volume ray marching algorithm comprising the steps of:
 a) determining a ray start voxel position as a floating-point 3D coordinate with values (ixf, iyf, izf), at which a ray of sight enters the set of 3D voxel data, and a ray exit voxel position as a floating-point 3D coordinate with values (exf, eyf, ezf), at which the ray of sight exits the set of 3D voxel data;
 b) determining a ray direction as a floating point vector (dxf, dyf, dzf), along which the ray of sight advances through the 3D voxel data;
 c) setting a ray start subcube position [s1, s2, s3];
 d) starting at the current top or middle node at a current ray position at a subcube inside said current top or middle node,
  (i) if the current ray position subcube is occupied, moving down the tree to the next lower tree node represented by said subcube, and repeating step d) at the next lower tree level if the next lower level is comprised of middle nodes and moving to step e) at the next lower level if the next lower level is comprised of leaf nodes,
  (ii) calculating a marching step to take from said current level node subcube to one of six current level node subcubes that respectively adjoin six faces of said current level node subcube, to follow the ray of sight,
  (iii) after taking each marching step in (ii), updating a floating-point voxel position (xf, yf, zf) and the subcube position [s1, s2, s3] and aligning the floating-point voxel position with the subcube position, and
  (iv) repeating (i) until hitting an occupied current level node subcube or until a checked subcube location has existed a local group of current level node subcubes being traversed through; and e) starting at the current level node whose children are voxels at the current ray position at a first voxel node representing the highest level of resolution stored,
  (i) calculating a marching step to take from said first voxel to one of six voxels that respectively adjoin six faces of said first voxel, to continue following the ray of sight, and
  (ii) repeating (i) until hitting an occupied voxel or until a checked voxel location has exited a local group of voxels being traversed through.

3. The system of claim 1, wherein the processor, in operation, renders the 3D voxel data on the display by executing a volume ray marching algorithm to compute a 2D image of the set of 3D voxel data, the volume ray marching algorithm comprising the steps of:

selecting an initial voxel in an initial subcube at which a ray of sight enters the set of 3D voxel data, and selecting a last voxel in a last subcube from which the ray of sight exits the set of 3D voxel data; and selecting one of a plurality of voxel marching paths based on the selected initial and last voxels, each of the plurality of voxel marching paths being pre-calculated to enter the set of 3D voxel data via a voxel and exit the set of 3D voxel data via another voxel and being pre-stored in the memory.

4. A non-transitory computer-readable storage medium including computer-executable instructions which, when loaded to a memory coupled to a display and a processor, execute an algorithm comprising:

(A) loading to the memory a set of 3D voxel data arranged in a $N^3$-tree data structure, the $N^3$-tree data structure including:

a top node representing a cube and including 64 occupancy bits and 32 index bits, an occupied or empty state of each of 64 subcubes in the cube being indicated by 1 occupancy bit of the 64 occupancy bits, and the 32 index bits value representing a first pointer to a memory location of middle nodes, the middle nodes representing M occupied subcubes, respectively, each including 64 occupancy bits and 32 index bits, an occupied or empty state of each of 64 voxels in the occupied subcube being indicated by 1 occupancy bit of the 64 occupancy bits, and the 32 index bits value representing a second pointer to a memory location of either another layer of the middle nodes or the final layer of the leaf nodes in the occupied subcube, wherein M is a positive integer, and the leaf nodes respectively representing N occupied voxels in the occupied subcube, each leaf node including a voxel specific index number generated from the parent middle node, to be combined with a pointer to the start of the memory location of at least one type of attribute value of the occupied voxel arranged in an attribute array, wherein N is a positive integer; where the index to any current middle node or leaf voxel node can be calculated from the parent node's index value pointing to the start of child nodes plus a population count of the parent occupancy bits denoting how far to offset from the start of child nodes to reach the current middle node or leaf node; and (B) rendering the set of 3D voxel data on the display.

5. The storage medium of claim 4, wherein the $N^3$-tree data structure includes, between the top node and the leaf nodes, a first level of the middle nodes above the leaf nodes and a second level of the middle nodes above the first level, the middle nodes at the second level each including 64 occupancy bits and 32 index bits, an occupied or empty state of each of 64 possible sub-subcubes at the first level included in the subcube at the second level being indicated by 1 occupancy bit of the 64 occupancy bits at the second level, and the 32 index bits at the second level representing a pointer to the memory location at the start of the middle nodes for a specific subcube at the first level.

6. The storage medium of claim 4, wherein the at least one type of attribute value of the occupied voxel includes one or more of a color value, a transparency value, a normal value, an intensity value, a density value, a temperature value, and a layer number.

7. The storage medium of claim 4, wherein two or more types of attribute values are stored for each occupied voxel and the two or more types of attribute values are aligned in the memory.

8. The storage medium of claim 4, wherein each of the M occupied subcubes is associated with at least one summary attribute value, which is an attribute value of the all child node subcubes as a whole.

9. The storage medium of claim 4, wherein (B) of rendering of the set of 3D voxel data on the display includes executing a volume ray marching algorithm to compute a 2D image of the set of 3D voxel data, the volume ray marching algorithm comprising the steps of:

a) determining a ray start voxel position as a floating-point 3D coordinate with values (ixf, iyf, izf), at which a ray of sight enters the set of 3D voxel data, and a ray exit voxel position as a floating-point 3D coordinate with values (exf, eyf, ezf), at which the ray of sight exits the set of 3D voxel data;

b) determining a ray direction as a floating point vector (dxf, dyf, dzf), along which the ray of sight advances through the 3D voxel data;

c) setting a ray start subcube position [s1, s2, s3];

d) starting at the current top or middle node at a current ray position at a subcube inside said current top or middle node,
  (i) if the current ray position subcube is occupied, moving down the tree to the next lower level tree node represented by said subcube, and repeating step d) at the next lower tree level if the next lower level is comprised of middle nodes and moving to step e) at the next lower level if the next lower level is comprised of leaf nodes,
  (ii) calculating a marching step to take from said current level node subcube to one of six current level node subcubes that respectively adjoin six faces of said current level node subcube, to follow the ray of sight,
  (iii) after taking each marching step in (ii), updating a floating-point voxel position (xf, yf, zf) and the subcube position [s1, s2, s3] and aligning the floating-point voxel position with the subcube position, and
  (iv) repeating (i) until hitting an occupied current level node subcube or until a checked subcube location has exited a local group of current level node subcubes being traversed through; and e) starting at the current level node whose children are voxels at the current ray position at a first voxel node representing the highest level of resolution stored, (i) calculating a marching step to take from said first voxel to one of six voxels that respectively adjoin six faces of said first voxel, to continue following the ray of sight, and (ii) repeating (i) until hitting an occupied voxel or until a checked voxel location has existed a local group of voxels being traversed through.

10. The storage medium of claim 9, wherein the volume ray marching algorithm utilizes a Bresenham's line algorithm comprising the steps of:

d) (i) selecting the marching step to take from said current level node subcube to one of six current level node subcubes, which is closest to the ray of sight; and e) (i) selecting the marching step to take from said first voxel to one of six voxels, which is closest to the ray of sight.

11. The storage medium of claim 9, wherein d)(iii) of aligning the floating-point voxel position with the subcube position after each step within a subcube at a level in the $N^3$-tree data structure, includes one of: adjusting the floating-point voxel position to match it to the subcube position at the current level, or adjusting the subcube position at the current level to match it to the floating-point voxel position.

12. The storage medium of claim 9, wherein d)(iii) of aligning the floating-point voxel position with the subcube position includes, where a difference between a sub cube coordinate of the floating-point voxel position and a subcube coordinate of the subcube position is +3 or −3, the difference is adjusted to be −1 or +1, respectively, to account for wrap-around of subcube coordinates.

13. The storage medium of claim 4, wherein the algorithm further comprises:

building in the memory a 3D cache of an area representing a voxel box of dimensions (x,y,z), the 3D cache having dimension (x/D, y/D, zD) smaller than the voxel box where D is a positive integer greater than 1, wherein each entry in the 3D cache contains an index that is either filled with a default null value, or that points to a subcube, at the tree node level that is immediately above the leaf nodes level, wherein the non-null filled cache indexes each represents a shortcut to access a subcube at the tree node level that is immediately above the leaf nodes level, the subcube including 64 occupancy bits and 32 index bits representing the second pointer to a memory location of occupied leaf nodes representing occupied voxels included in the subcube.

14. The storage medium of claim 13, wherein the algorithm further comprises:

performing a first bitfield conversion from an attribute array in normal mode to an attribute array in 64-wide attribute packing mode, the attribute array in normal mode including memory space to store at least one type of attribute value for each of only occupied voxel(s) included in the subcube, and the attribute array in 64-wide attribute packing mode including memory space to store the at least one type of attribute value for each of the maximum 64 possible voxels included in the subcube; and performing a second bitfield conversion from the attribute array in 64-wide attribute packing mode to the attribute array in normal mode.

15. The storage medium of claim 14, wherein the attribute array in normal mode is indicated by the 64 occupancy bits of the subcube representing a non-zero value, and the attribute array in 64-wide attribute packing mode is indicated by the 64 occupancy bits of the subcube being all zeros.

16. The storage medium of claim 4, wherein the algorithm further comprises:

loading to the memory a source $N^3$-tree data structure including empty spaces;

determining the number of nodes included at each level of the source $N^3$-tree data structure;

generating, in the memory, a destination $N^3$-tree data structure having exact memory space to contain all the numbers of nodes at respective levels of the source $N^3$-tree data structure; and copying the nodes at respective levels of the source $N^3$-tree data structure to the corresponding levels of the destination $N^3$-tree data structure, and using the destination $N^3$-tree data structure as the $N^3$-tree data structure in which the M sets of 64 occupancy bits and 32 index bits are contiguously stored for the M occupied subcubes at the middle nodes level, and the N attribute values for the N occupied voxels are contiguously stored at the leaf nodes level.

17. The storage medium of claim 4, wherein the algorithm further comprises:

loading to the memory several source sets of 3D voxel data and a summary set of 3D voxel data each arranged in the $N^3$-tree data structure, wherein the several source sets of 3D voxel data represent 3D objects which form a combined 3D object in the summary set of 3D voxel data, growing a box size of the summary set of 3D voxel data large enough to enclose all of the 3D space occupied by every voxel contained in a box size of each of the source sets of 3D voxel data, by transforming the source sets of 3D voxel data into 3D box bounds of the summary set of 3D voxel data in a 3D space of the summary set of 3D voxel data and enlarging the 3D box bounds to fit, and writing the voxels contained in each source set of 3D voxel data into the summary set of 3D voxel data by transforming each voxel location into the 3D space of the summary set of 3D voxel data, thereby creating a summary voxel set containing data of the several source voxel sets of 3D voxel data.

18. The storage medium of claim 4, wherein the algorithm further comprises:

determining whether a rendering speed of the 3D voxel data does not meet a defined threshold speed; and reducing a maximum depth of nodes to which the $N^3$-tree data structure is traversed until the rendering speed meets the defined threshold speed.

19. The storage medium of claim 4, wherein the algorithm further comprises:

determining a level of detail achievable by a resolution of the display; and stopping traversing the $N^3$-tree data structure at a level higher than the leaf node level when a level of detail associated with said level higher than the bottom node equals or exceeds said level of detail achievable by the resolution of the display.

20. The storage medium of claim 4, wherein the algorithm further comprises:

loading nodes from the top node to middle nodes at a level immediately above the leaf nodes in one section of the memory, and loading the leaf nodes in another section of the memory separate from said one section.

21. The storage medium of claim 4, wherein the algorithm further comprises:
- i) initializing at least a first 2D buffer and a second 2D buffer,
- ii) for each 2D coordinate of the first 2D buffer, performing a first pass of traversing the $N^3$-tree data structure from the top node to a hit leaf node, extracting corresponding attribute values of the hit leaf node from the attribute array and storing the attribute values in the second 2D buffer;
- iii) performing a second pass for each 2D coordinate of the first 2D buffer, determining a display value of the 2D coordinate by computing color and lighting based on the attribute values stored in the second 2D buffer, and storing the determined display value in the first 2D buffer at the corresponding 2D coordinate; and
- iv) rendering the display values of the first 2D buffer on the display.

22. The storage medium of claim 21, wherein the first 2D buffer is a 32 bit integer buffer (A), the second 2D buffer includes three sub-buffers which are respectively a 32 bit floating point buffer (B), a 4×32 bit floating point buffer (C), and a 4×16 bit integer buffer (D),
- wherein a value of (B) is a voxel depth of the hit leaf node at the 2D coordinate of (A), values of (C) are x, y, and z components of a normal value of the hit leaf node, and values of (D) are different types of attribute values of the hit leaf node including at least one of a color value, an intensity value, or a layer value.

23. The system of claim 2, wherein step d) i) includes stopping the tree traversal at any middle node and using the position and size of that node if resolution provided by that node suffices.

24. The system of claim 2, wherein step d) iv) and step e) ii) each include determining to repeat (i) based on a single boolean conditional check of whether an occupied subcube has not been hit and whether the marching step is still inside the local group of current level node subcubes.

25. The system of claim 9, wherein step d) i) includes stopping the tree traversal at any middle node and using the position and size of that node if resolution provided by that node suffices.

26. The system of claim 9, wherein step d) iv) and step e) ii) each include determining to repeat (i) based on a single boolean conditional check of whether an occupied subcube has not been hit and whether the marching step is still inside the local group of current level node subcubes.

* * * * *

UNITED STATES PATENT AND TRADEMARK OFFICE
CERTIFICATE OF CORRECTION

PATENT NO. : 9,754,405 B1  
APPLICATION NO. : 14/822560  
DATED : September 5, 2017  
INVENTOR(S) : Jonathan Young et al.

Page 1 of 1

It is certified that error appears in the above-identified patent and that said Letters Patent is hereby corrected as shown below:

On the Title Page

Item (56):
"6,532,017 B1 3/2003 Peet et al." should read, --6,532,017 B1 3/2003 Knittel et al.--.

Signed and Sealed this
Twenty-fourth Day of October, 2017

Joseph Matal
*Performing the Functions and Duties of the*
*Under Secretary of Commerce for Intellectual Property and*
*Director of the United States Patent and Trademark Office*